United States Patent
Ma et al.

(10) Patent No.: US 12,464,035 B2
(45) Date of Patent: Nov. 4, 2025

(54) SIGNALING OF PROTOCOL DATA UNIT SET INFORMATION

(71) Applicant: QUALCOMM Incorporated, San Diego, CA (US)

(72) Inventors: Liangping Ma, San Diego, CA (US); Nikolai Konrad Leung, San Francisco, CA (US); Imed Bouazizi, Frisco, TX (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/468,314

(22) Filed: Sep. 15, 2023

(65) Prior Publication Data

US 2025/0097281 A1 Mar. 20, 2025

(51) Int. Cl.
*H04L 65/65* (2022.01)
*H04L 5/00* (2006.01)

(52) U.S. Cl.
CPC ............ *H04L 65/65* (2022.05); *H04L 5/0053* (2013.01)

(58) Field of Classification Search
CPC .............................. H04L 65/55; H04L 5/0053
See application file for complete search history.

(56) References Cited

U.S. PATENT DOCUMENTS

| | | | | |
|---|---|---|---|---|
| 9,801,200 | B2 * | 10/2017 | Quan | H04L 1/1896 |
| 2006/0268822 | A1 * | 11/2006 | Chun | H04L 47/2441 |
| | | | | 370/349 |
| 2011/0029831 | A1 * | 2/2011 | Lee | H04L 1/1861 |
| | | | | 714/E11.131 |
| 2011/0211457 | A1 * | 9/2011 | Larmo | H04L 1/1671 |
| | | | | 370/241 |
| 2014/0295790 | A1 * | 10/2014 | Vos | H04M 15/8027 |
| | | | | 455/406 |
| 2016/0308776 | A1 * | 10/2016 | Ozturk | H04L 47/365 |
| 2021/0021664 | A1 * | 1/2021 | Oyman | H04N 19/597 |
| 2022/0386165 | A1 * | 12/2022 | Liu | H04W 76/14 |
| 2023/0114120 | A1 | 4/2023 | You et al. | |
| 2023/0309100 | A1 * | 9/2023 | Baek | H04W 72/20 |
| 2023/0319628 | A1 * | 10/2023 | Uchino | H04L 69/321 |
| | | | | 370/328 |
| 2024/0031066 | A1 * | 1/2024 | Shirivastava | H04W 4/06 |
| 2024/0064190 | A1 * | 2/2024 | Yang | H04L 65/1069 |
| 2024/0147325 | A1 * | 5/2024 | He | H04W 36/023 |
| 2024/0163711 | A1 * | 5/2024 | Mondet | H04W 28/0268 |
| 2024/0196265 | A1 * | 6/2024 | Starsinic | H04W 28/0289 |

(Continued)

OTHER PUBLICATIONS

International Search Report and Written Opinion—PCT/US2024/043021—ISA/EPO—Nov. 28, 2024.

*Primary Examiner* — Douglas B Blair
(74) *Attorney, Agent, or Firm* — Harrity & Harrity, LLP

(57) ABSTRACT

Various aspects of the present disclosure generally relate to wireless communication. In some aspects, a first network node may transmit, to a second network node during a first time period, at least one packet of a first protocol data unit (PDU) set, the at least one packet of the first PDU set comprising PDU set information associated with a second PDU set. The first network node may transmit, to the second network node during a second time period that occurs subsequent to the first time period, at least one packet of the second PDU set. Numerous other aspects are described.

29 Claims, 11 Drawing Sheets

(56) References Cited

U.S. PATENT DOCUMENTS

| | | |
|---|---|---|
| 2024/0251285 A1* | 7/2024 | He ........................ H04W 28/04 |
| 2024/0259319 A1* | 8/2024 | Mate ....................... H04L 65/65 |
| 2024/0259454 A1* | 8/2024 | Kammachi Sreedhar ................... H04L 65/70 |
| 2024/0259856 A1* | 8/2024 | Kanamarlapudi ........................... H04W 28/0236 |

* cited by examiner

SIGNALING OF PROTOCOL DATA UNIT SET INFORMATION

FIELD OF THE DISCLOSURE

Aspects of the present disclosure generally relate to wireless communication and to techniques and apparatuses for signaling of protocol data unit set information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a first network node. The apparatus may include one or more memories and one or more processors coupled to the one or more memories. The one or more processors may be configured to cause the apparatus to transmit, to a second network node during a first time period, at least one packet of a first protocol data unit (PDU) set, the at least one packet of the first PDU set comprising PDU set information associated with a second PDU set. The one or more processors may be configured to cause the apparatus to transmit, to the second network node during a second time period that occurs subsequent to the first time period, at least one packet of the second PDU set.

Some aspects described herein relate to an apparatus for wireless communication at a second network node. The apparatus may include one or more memories and one or more processors coupled to the one or more memories. The one or more processors may be configured to cause the apparatus to transmit, to a user equipment (UE) during a first time period, at least one packet of a first PDU set, the at least one packet of the first PDU set comprising PDU set information associated with a second PDU set. The one or more processors may be configured to cause the apparatus to receive, from the UE, extracted PDU set information associated with the PDU set information. The one or more processors may be configured to cause the apparatus to receive from a first network node during a second time period that occurs subsequent to the first time period, at least one packet of the second PDU set. The one or more processors may be configured to cause the apparatus to transmit, in association with the extracted PDU set information, the at least one packet of the second PDU set.

Some aspects described herein relate to an apparatus for wireless communication at a UE. The apparatus may include one or more memories and one or more processors coupled to the one or more memories. The one or more processors may be configured to cause the apparatus to receive, from a network node during a first time period, at least one packet of a first PDU set, the at least one packet of the first PDU set comprising PDU set information associated with a second PDU set. The one or more processors may be configured to cause the apparatus to transmit, to the network node, extracted PDU set information associated with the PDU set information. The one or more processors may be configured to cause the apparatus to receive, in association with the extracted PDU set information and during a second time period that occurs subsequent to the first time period, at least one packet of the second PDU set.

Some aspects described herein relate to a method of wireless communication performed by a first network node. The method may include transmitting, to a second network node during a first time period, at least one packet of a first PDU set, the at least one packet of the first PDU set comprising PDU set information associated with a second PDU set. The method may include transmitting, to the second network node during a second time period that occurs subsequent to the first time period, at least one packet of the second PDU set.

Some aspects described herein relate to a method of wireless communication performed by a second network node. The method may include transmitting, to a UE during a first time period, at least one packet of a first PDU set, the at least one packet of the first PDU set comprising PDU set information associated with a second PDU set. The method may include receiving, from the UE, extracted PDU set information associated with the PDU set information. The method may include receiving from a first network node during a second time period that occurs subsequent to the first time period, at least one packet of the second PDU set.

The method may include transmitting, in association with the extracted PDU set information, the at least one packet of the second PDU set.

Some aspects described herein relate to a method of wireless communication performed by a UE. The method may include receiving, from a network node during a first time period, at least one packet of a first PDU set, the at least one packet of the first PDU set comprising PDU set information associated with a second PDU set. The method may include transmitting, to the network node, extracted PDU set information associated with the PDU set information. The method may include receiving, in association with the extracted PDU set information and during a second time period that occurs subsequent to the first time period, at least one packet of the second PDU set.

Some aspects described herein relate to a non-transitory computer-readable medium that stores a set of instructions for wireless communication by a first network node. The set of instructions, when executed by one or more processors of the first network node, may cause the first network node to transmit, to a second network node during a first time period, at least one packet of a first PDU set, the at least one packet of the first PDU set comprising PDU set information associated with a second PDU set. The set of instructions, when executed by one or more processors of the first network node, may cause the first network node to transmit, to the second network node during a second time period that occurs subsequent to the first time period, at least one packet of the second PDU set.

Some aspects described herein relate to a non-transitory computer-readable medium that stores a set of instructions for wireless communication by a second network node. The set of instructions, when executed by one or more processors of the second network node, may cause the second network node to transmit, to a UE during a first time period, at least one packet of a first PDU set, the at least one packet of the first PDU set comprising PDU set information associated with a second PDU set. The set of instructions, when executed by one or more processors of the second network node, may cause the second network node to receive, from the UE, extracted PDU set information associated with the PDU set information. The set of instructions, when executed by one or more processors of the second network node, may cause the second network node to receive from a first network node during a second time period that occurs subsequent to the first time period, at least one packet of the second PDU set. The set of instructions, when executed by one or more processors of the second network node, may cause the second network node to transmit, in association with the extracted PDU set information, the at least one packet of the second PDU set.

Some aspects described herein relate to a non-transitory computer-readable medium that stores a set of instructions for wireless communication by a UE. The set of instructions, when executed by one or more processors of the UE, may cause the UE to receive, from a network node during a first time period, at least one packet of a first PDU set, the at least one packet of the first PDU set comprising PDU set information associated with a second PDU set. The set of instructions, when executed by one or more processors of the UE, may cause the UE to transmit, to the network node, extracted PDU set information associated with the PDU set information. The set of instructions, when executed by one or more processors of the UE, may cause the UE to receive, in association with the extracted PDU set information and during a second time period that occurs subsequent to the first time period, at least one packet of the second PDU set.

Some aspects described herein relate to an apparatus for wireless communication. The apparatus may include means for transmitting, to a network node during a first time period, at least one packet of a first PDU set, the at least one packet of the first PDU set comprising PDU set information associated with a second PDU set. The apparatus may include means for transmitting, to the network node during a second time period that occurs subsequent to the first time period, at least one packet of the second PDU set.

Some aspects described herein relate to an apparatus for wireless communication. The apparatus may include means for transmitting, to a UE during a first time period, at least one packet of a first PDU set, the at least one packet of the first PDU set comprising PDU set information associated with a second PDU set. The apparatus may include means for receiving, from the UE, extracted PDU set information associated with the PDU set information. The apparatus may include means for receiving from a network node during a second time period that occurs subsequent to the first time period, at least one packet of the second PDU set. The apparatus may include means for transmitting, in association with the extracted PDU set information, the at least one packet of the second PDU set.

Some aspects described herein relate to an apparatus for wireless communication. The apparatus may include means for receiving, from a network node during a first time period, at least one packet of a first PDU set, the at least one packet of the first PDU set comprising PDU set information associated with a second PDU set. The apparatus may include means for transmitting, to the network node, extracted PDU set information associated with the PDU set information. The apparatus may include means for receiving, in association with the extracted PDU set information and during a second time period that occurs subsequent to the first time period, at least one packet of the second PDU set.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
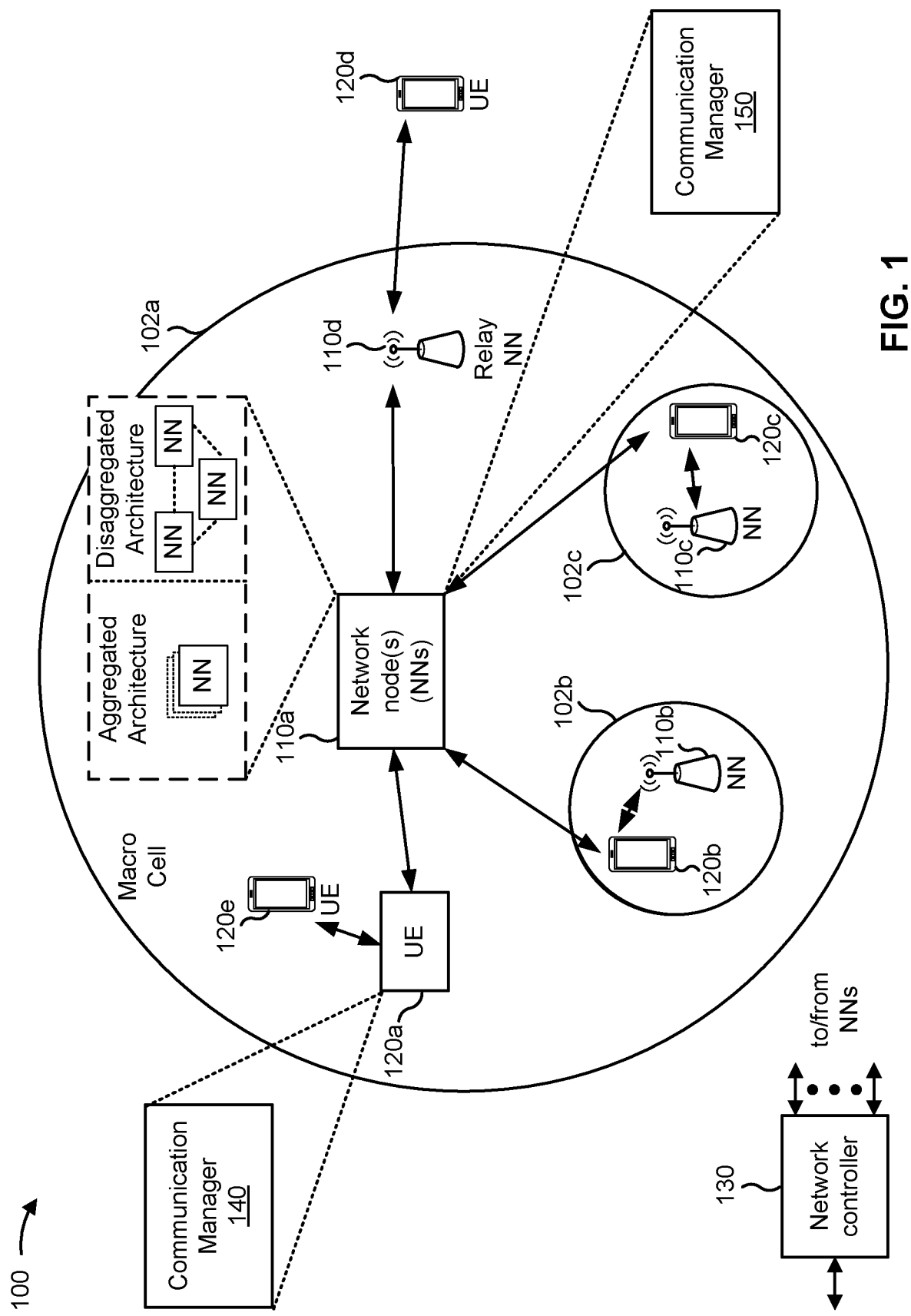
FIG. 1 is a diagram illustrating an example of a wireless network, in accordance with the present disclosure.

An application at a transmitter may generate information for consumption by an application at a receiver. For example, the information may include a unit of information that would benefit from being delivered to the receiver as an integrated unit after migrating through the transmitter's and receiver's network layers and radio access network (RAN) layers. To facilitate the delivery of a unit of information as an integrated unit (e.g., as opposed to handling different parts of the information independently and without consideration of the unit of information as a whole), a wireless communication technology (e.g., 5G/NR) may provide for protocol data units (PDUs) carrying the unit of information to be delivered as a PDU set. A PDU set may have common quality of service (QOS) attributes, such as a PDU set delay budget and a PDU set error rate. A PDU set may also be associated with various PDU set parameters, such as a PDU set importance parameter (indicating an importance level of the PDU set) or a PDU set integrated handling indication (PSIHI) (indicating whether the PDU set is an all-or-nothing PDU set or a non-all-or-nothing PDU set).

In some cases, a first network node may transmit a PDU set to a second network node. In some cases, PDU set information (information about the PDU set) can be carried in the payload and/or header (e.g., header extension) of one or more of the packets of the PDU set to allow a user plane function (UPF) to extract the PDU set information and convey it to the second network node for resource allocation in the RAN. In some cases, the PDU set information includes a PDU Set Sequence Number (PSSN) (e.g., 10 bits), a PDU Set Importance (PSI) (e.g., 4 bits), a PDU Set Size (PSSize) (e.g., 24 bits), an end PDU of the PDU Set (E) (e.g., 1 bit), and end of a data burst (EDB) (e.g., 3 bits), and/or a PDU Sequence Number within a PDU Set (PSN) (e.g., 6 bits), among other examples.

In some cases, however, the packet and/or the header may be encrypted. For example, in the case of secure real-time transport protocol (RTP) (SRTP), the RTP packet and the RTP header may be encrypted. If the RTP header (e.g., including the header extension) is encrypted, the UPF may not be able to access the PDU Set information from the RTP header extension of the RTP packet. In this case, because the second network node may be unaware of the PDU set information prior to transmitting the PDU set to a user equipment (UE), the second network node may allocate extra resources to be ensure sufficient resources are allocated for transmission of the PDU set. For example, without the PDU set information, the second network node may be unaware of the PDU set size and/or a time of arrival of a first packet of the PDU set. As a result, encryption of RTP headers (and/or packets) may result in inefficiencies in resource allocation.

Some aspects of the techniques and apparatuses described herein may facilitate signaling PDU set information in a way that enables a network node to allocate resources appropriately for transmission of the corresponding PDU set to a UE. For example, in some aspects, PDU set information associated with a PDU set N+1 may be included within an earlier transmitted PDU set (e.g., PDU set N). The PDU set information associated with the PDU set N+1 may be predicted by the first network node. For example, the PDU information may be predicted in association with a compression and/or encoding process associated with a prior PDU set (e.g., the PDU set N). In this way, the second network node may receive PDU set information associated with a PDU set prior to receiving the PDU set and, therefore, may use the PDU set information to allocate resources for transmitting the PDU set to a UE. In this way, some aspects may facilitate more efficient resource allocation, thereby positively impacting network and/or device performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first network node (e.g., the network node 110) may include a communication manager 150. As described in more detail elsewhere herein, the communication manager 150 may transmit, to a second network node during a first time period, at least one packet of a first PDU set, the at least one packet of the first PDU set comprising PDU set information associated with a second PDU set; and transmit, to the second network node during a second time period that occurs subsequent to the first time period, at least one packet of the second PDU set.

In some aspects, a second network node (e.g., the network node 110) may include the communication manager 150. As described in more detail elsewhere herein, the communication manager 150 may transmit, to a UE during a first time period, at least one packet of a first PDU set, the at least one packet of the first PDU set comprising PDU set information associated with a second PDU set; receive, from the UE, extracted PDU set information associated with the PDU set information; receive from a first network node during a second time period that occurs subsequent to the first time period, at least one packet of the second PDU set; and transmit, in association with the extracted PDU set information, the at least one packet of the second PDU set. Additionally, or alternatively, the communication manager 150 may perform one or more other operations described herein.

In some aspects, a UE (e.g., the UE 120) may include a communication manager 140. As described in more detail elsewhere herein, the communication manager 140 may receive, from a network node during a first time period, at least one packet of a first PDU set, the at least one packet of the first PDU set comprising PDU set information associated with a second PDU set; transmit, to the network node, extracted PDU set information associated with the PDU set information; and receive, in association with the extracted PDU set information and during a second time period that occurs subsequent to the first time period, at least one packet of the second PDU set. Additionally, or alternatively, the communication manager 140 may perform one or more other operations described herein.

As indicated above, FIG. 1 is provided as an example. Other examples may differ from what is described with regard to FIG. 1.

Figure 2:
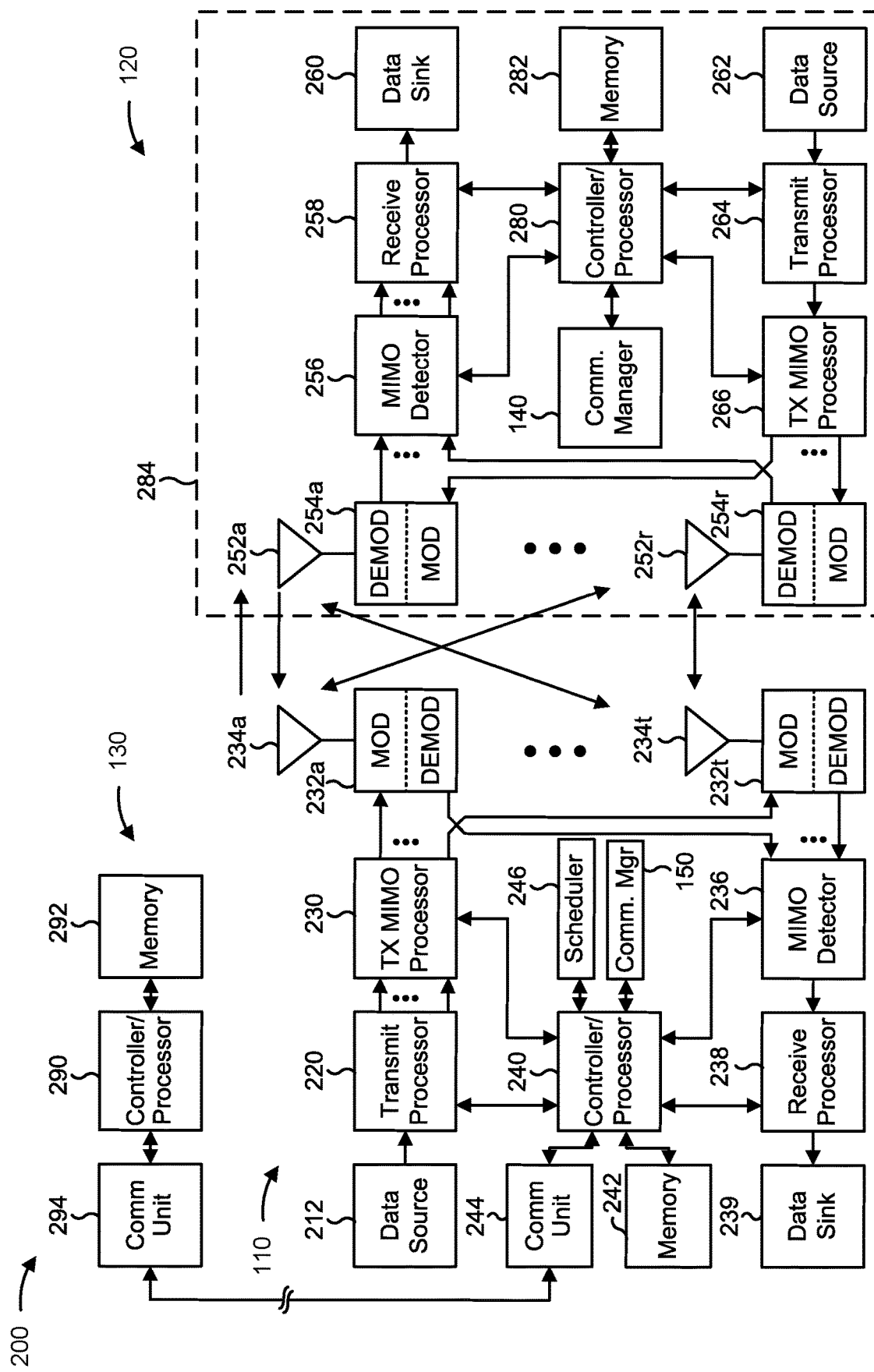
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) May indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with signaling of protocol data unit set information, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first network node (e.g., the network node 110) includes means for transmitting, to a second network node during a first time period, at least one packet of a first PDU set, the at least one packet of the first PDU set comprising PDU set information associated with a second PDU set; and/or means for transmitting, to the second network node during a second time period that occurs subsequent to the first time period, at least one packet of the second PDU set.

In some aspects, a second network node (e.g., the network node 110) includes means for transmitting, to a UE during a first time period, at least one packet of a first PDU set, the at least one packet of the first PDU set comprising PDU set information associated with a second PDU set; means for receiving, from the UE, extracted PDU set information associated with the PDU set information; means for receiving from a first network node during a second time period that occurs subsequent to the first time period, at least one packet of the second PDU set; and/or means for transmitting, in association with the extracted PDU set information, the at least one packet of the second PDU set. The means for the first network node and/or the second network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving, from a network node during a first time period, at least one packet of a first PDU set, the at least one packet of the first PDU set comprising PDU set information associated with a second PDU set; means for transmitting, to the network node, extracted PDU set information associated with the PDU set information; and/or means for receiving, in association with the extracted PDU set information and during a second time period that occurs subsequent to the first time period, at least one packet of the second PDU set. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, May be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
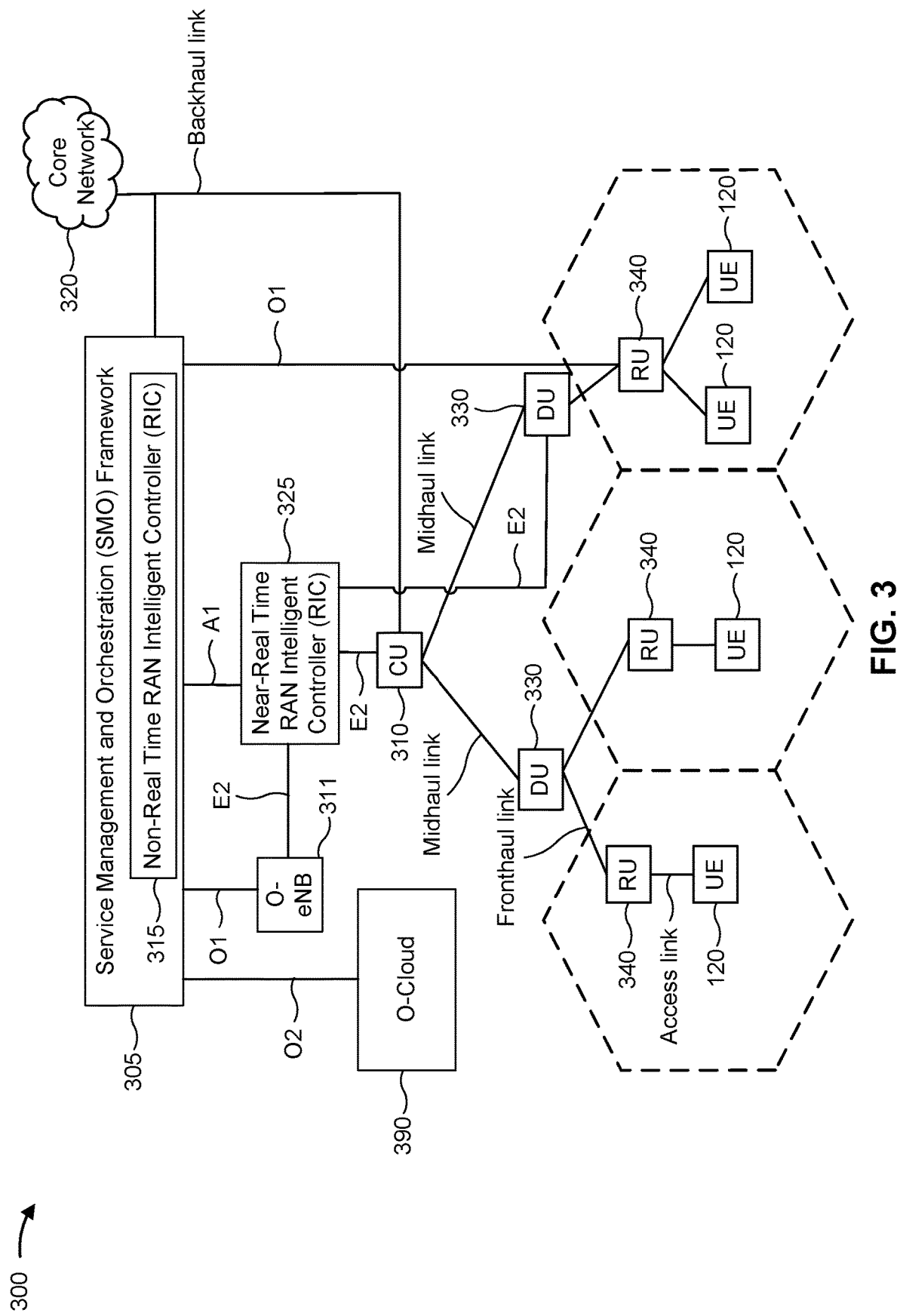
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
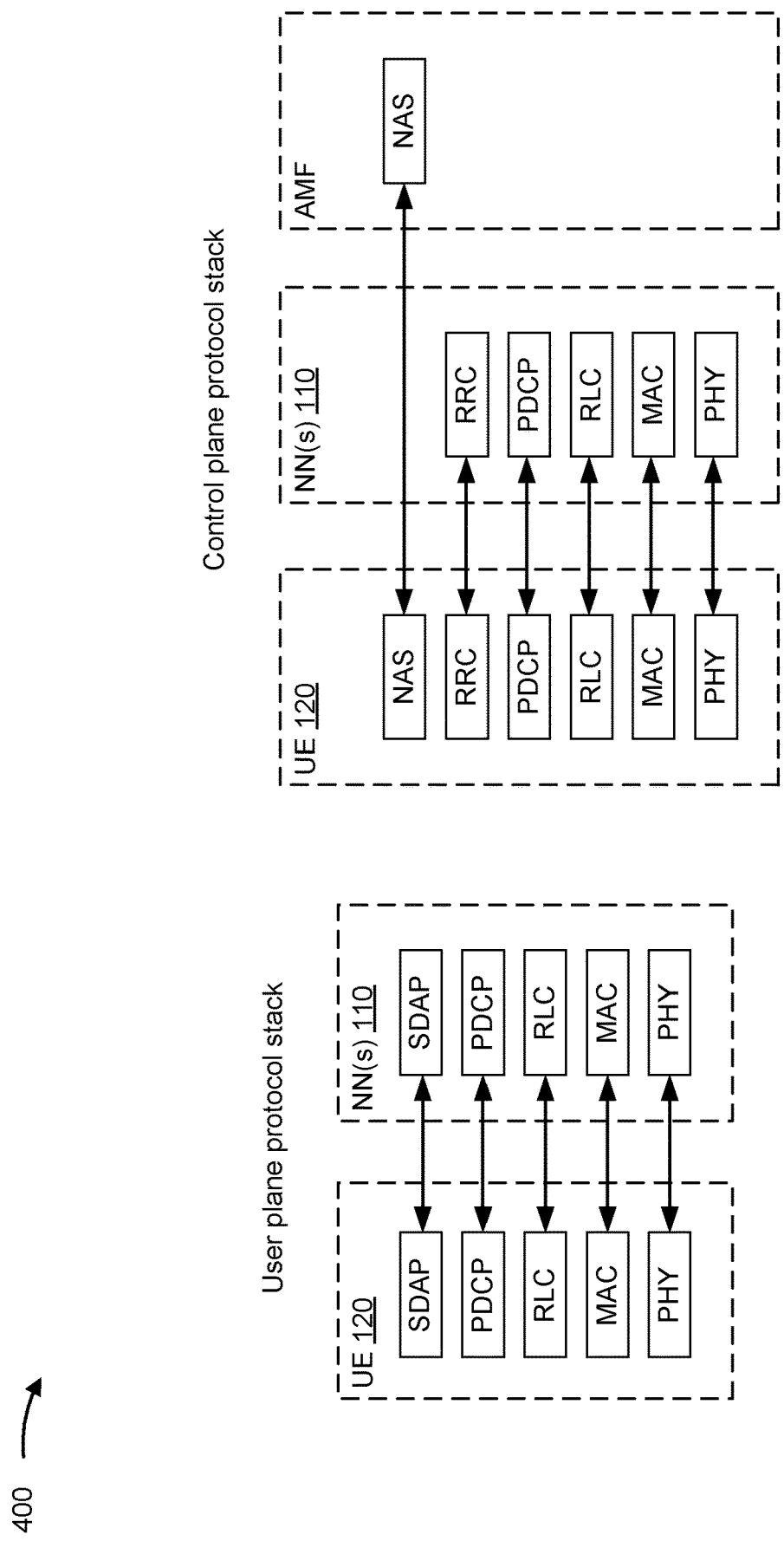
FIG. 4 is a diagram illustrating an example of a user plane protocol stack and a control plane protocol stack for a network node and a core network in communication with a UE, in accordance with the present disclosure.

FIG. 4 is a diagram illustrating an example 400 of a user plane protocol stack and a control plane protocol stack for a network node 110 and a core network in communication with a UE 120, in accordance with the present disclosure. In some aspects, the network node 110 may include a plurality of network nodes 110. In some aspects, protocol stack functions of the network node 110 may be distributed across multiple network nodes 110. For example, a first network node 110 may implement a first layer of a protocol stack and a second network node 110 may implement a second layer of the protocol stack. The distribution of the protocol stack across network nodes (in examples where the protocol stack is distributed across network nodes) may be based at least in part on a functional split, as described elsewhere herein. It should be understood that references to "a network node 110" or "the network node 110" can, in some aspects, refer to multiple network nodes.

On the user plane, the UE 120 and the network node 110 may include respective physical (PHY) layers, medium access control (MAC) layers, radio link control (RLC) layers, packet data convergence protocol (PDCP) layers, and service data adaptation protocol (SDAP) layers. A user plane function (UPF) may handle transport of user data between the UE 120 and the network node 110. On the control plane, the UE 120 and the network node 110 may include respective radio resource control (RRC) layers. Furthermore, the UE 120 may include a non-access stratum (NAS) layer in communication with an NAS layer of an access and management mobility function (AMF). The AMF may be associated with a core network associated with the network node 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 4, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QOS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a PDCP discard timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

As mentioned, the PDCP layer (e.g., a PDCP entity) may be configured with a PDCP discard timer. A PDCP discard timer (sometimes indicated by a parameter such as discardTimer of a PDCP-Config configuration) may indicate a length of time, such as in milliseconds (ms). At a transmitter (e.g., a UE 120 on the uplink or a network node 110 on the downlink), a PDCP entity may receive a packet, such as a PDCP SDU or a data packet, from a higher layer (e.g., RRC or SDAP). The PDCP entity may buffer the packet in a transmission buffer for up to the length of the PDCP discard timer. For example, the PDCP entity may buffer the packet in the transmission buffer until a status report is received by the transmitter indicating successful reception, or the PDCP discard timer expires. After the PDCP discard timer expires, the packet may be discarded (e.g., flushed, dropped, deleted from the buffer). In some examples, the PDCP discard timer may be configured per PDCP PDU, such that all data (e.g., packets, PDCP SDUs) of a given PDCP PDU are buffered until a status report indicating successful reception is received or the PDCP discard timer expires for the given PDCP PDU. Some techniques described herein provide for a PDCP discard timer to be configured and used per PDU set (e.g., PDCP PDU set), as described in more detail elsewhere herein.

The PDCP layer may provide data, in the form of PDCP PDUs, to the RLC layer via RLC channels. The RLC layer may handle transfer of upper layer (e.g., PDCP) PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

As mentioned, the RLC layer may handle reassembly of an SDU. Reassembly may be supported in unacknowledged mode and/or in acknowledged mode. At a transmitter (e.g., a network node 110 on the downlink or a UE 120 on the uplink), an RLC layer may segment higher-layer data (e.g., an RLC SDU) into a set of RLC PDUs, and may provide the set of RLC PDUs for transmission over the air interface. A receiver (e.g., a UE 120 on the downlink or a network node 110 on the uplink) may receive at least part of the set of RLC PDUs, and may store the set of RLC PDUs in a reassembly buffer. The receiver may attempt to reassemble the RLC SDU from the received RLC PDUs, referred to herein as "performing reassembly." The receiver may perform reassembly according to a reassembly timer, which may be configured as part of an RLC-Config configuration. The receiver may start the reassembly timer when a first RLC PDU of a new RLC SDU is received, and may reset the timer when all RLC PDUs of the RLC SDU have been received. If the reassembly timer expires before all RLC PDUs of the RLC SDU have been received, then the receiver may transmit a status report, which may trigger retransmission of a missed RLC PDU of the RLC SDU. The reassembly timer may be configured in connection with an RLC entity. Some techniques described herein may provide for an RLC entity to be configured to correspond to a PDU set parameter, such as a PDU set importance parameter, as described elsewhere herein.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into a set of RLC PDUs, and so on. In effect, the PDU carries at least part of the SDU as a payload.

Some techniques described herein relate to PDU sets. A PDU set includes one or more PDUs. The one or more PDUs may carry a payload of a unit of information generated at an application layer. As just one example, the unit of information may include a video frame or a slice within a video frame, such as may be generated by or consumed by an extended reality (XR) application. An application associated with a transmitter may provide such a unit of information to a network layer associated with the transmitter. The network layer may segment the unit of information into a set of PDUs of a PDU set (e.g., network PDUs), and may provide an indication (e.g., in each PDU of the PDU set) that the set of PDUs belong to a single PDU set. The PDU set may correspond to the unit of information. At the transmitter, the network layer may provide the set of PDUs to a RAN protocol stack, such as the user plane protocol stack of FIG. 4, for processing and transmission via the RAN, as described above. At the receiver, a RAN protocol stack (e.g., the user plane protocol stack described above) may receive wireless communications carrying PDUs (e.g., RLC PDUs) derived from the set of PDUs generated by the network layer. The RAN protocol stack may attempt to obtain the set of PDUs from the received wireless communications, and if successful, may provide the set of PDUs to a network layer of the receiver for provision to an application layer of the receiver as the unit of information. Thus, while the RAN stack of a transmitter or receiver may handle PDUs of the set of PDUs as individual PDUs, the RAN stack may have some indication that the set of PDUs belong to a PDU set. PDUs belonging to a PDU set may be associated with an indication that the PDUs belong to the PDU set, such as a PDU set sequence number.

All PDUs of a PDU set may share common QoS parameters, such as a PDU set delay budget (PSDB) and/or a PDU set error rate (PSER). The PSDB may indicate a time between reception of a first PDU of a PDU set and successful delivery of a last arrived PDU of the PDU set. The PSER may indicate an upper bound for a rate of PDU sets that have been processed by a sender of a link layer protocol but that are not successfully delivered by a corresponding receiver to an upper layer.

Some PDU sets may require the successful reception of all PDUs of the PDU set for the underlying unit of information to be deemed to be successfully recovered. For such a PDU set, if any PDU in the PDU set is lost, the unit of information of the PDU set may be deemed to be unrecoverable. Such a PDU set is referred to herein as an "all-or-nothing" PDU set.

On the other hand, in some examples, a unit of information may be recoverable from a PDU set if fewer than all PDUs of the PDU set are received or recovered. For example, the PDUs of the PDU set may be encoded using an encoding scheme that provides recovery from one or more dropped PDUs, such as application-layer forward error correction (FEC) encoding. FEC encoding provides for redundant information to the PDUs being transmitted in order to detect and correct errors that may occur during transmission. FEC works by adding redundant information in the form of check symbols to the original data, which can be used at the receiver to detect and correct errors. Depending on the redundancy ratio of the FEC encoding, only a proper subset of PDUs in the PDU set are needed by the application layer to decode the PDU set. Such a PDU set is referred to herein as a "non-all-or-nothing" PDU set. Whether a PDU set is an all-or-nothing PDU set or a non-all-or-nothing PDU set may be indicated by a PDU set parameter corresponding to the PDU set, referred to herein as a PDU set integrated handling indication (PSIHI). For example, the PSIHI may indicate whether all PDUs of a PDU set are needed for the usage of the PDU set (e.g., the underlying unit of information of the PDU set) by the application layer.

Different PDU sets may have different levels of importance. For example, decoding of a first PDU set (or multiple PDU sets) may depend on data included in a second PDU set (e.g., due to a video encoding or compression scheme associated with the underlying units of data of the first PDU set and the second PDU set). Due to this dependency, the second PDU set may be considered more important to the application layer than the first PDU set(s). An application (e.g., an application function) may indicate an importance level of a PDU set via a PDU set parameter referred to herein as a PDU set importance parameter. A PDU set associated with a higher importance level may be less likely to be discarded, in the event of congestion, than a PDU set associated with a lower importance level. A PDU set associated with a higher importance level may also be prioritized for scheduling, leading to a higher likelihood of satisfying a delivery deadline than a PDU set associated with a lower importance level. PDU set importance parameters can be mapped to importance levels in any suitable fashion. PDU sets associated with a same traffic flow and having different importance levels may be mapped to the same QoS flow, and may therefore have the same PSDB, PSER, and/or other QoS parameters (e.g., priority, guaranteed bit rate (GBR), maximum data burst volume (MDBV), etc.).

As indicated above, FIG. 4 is provided as an example. Other examples may differ from what is described with regard to FIG. 4.

Figure 5:
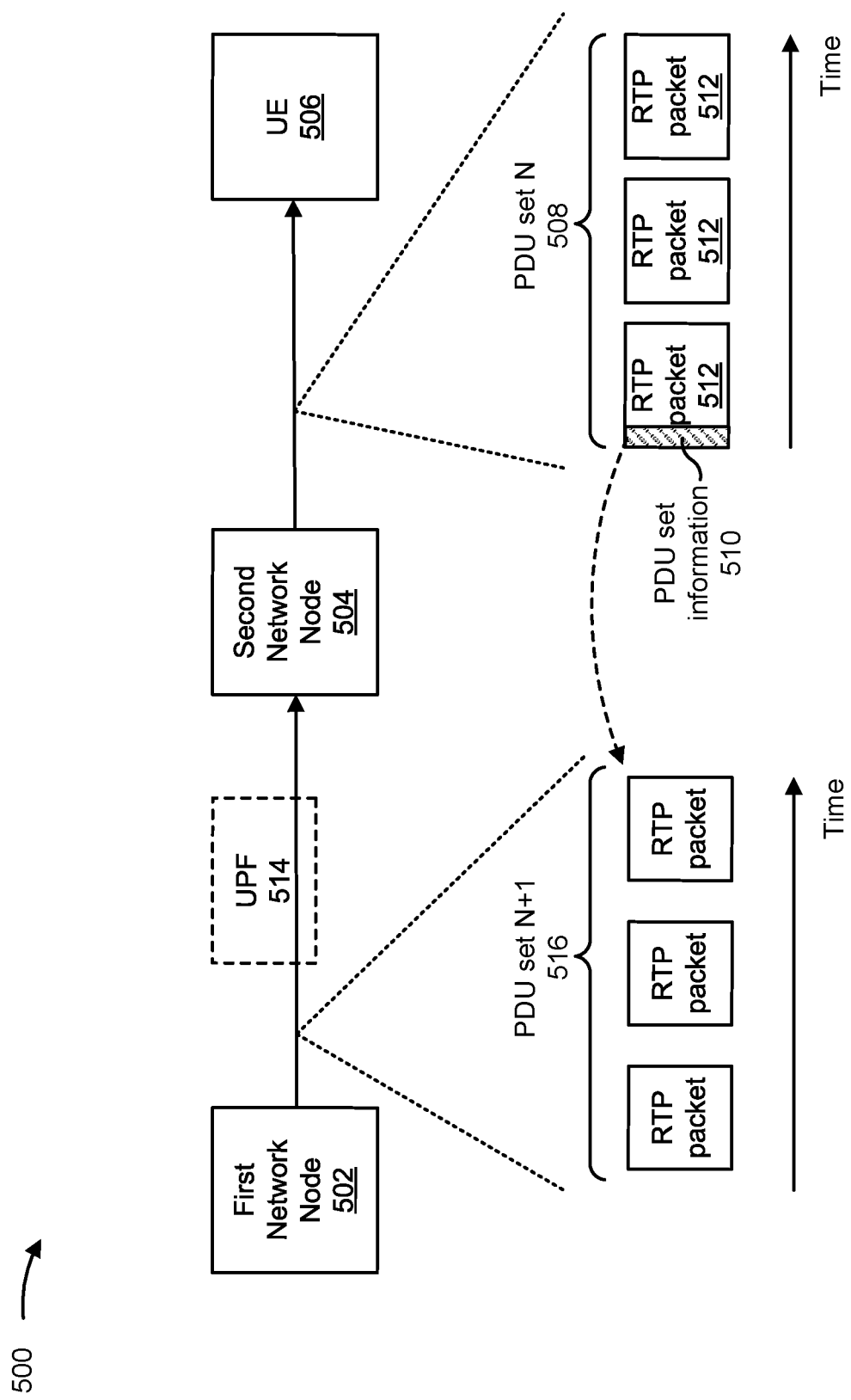
FIG. 5 is a diagram illustrating communication of protocol data unit (PDU) sets, in accordance with the present disclosure.

FIG. 5 is a diagram illustrating communication of PDU sets, in accordance with the present disclosure. As shown, a first network node 502 may communicate with a second network node 504, and the second network node 504 may communicate with a UE 506. In some aspects, the first network node 502 may be, be similar to, include, or be included in, an edge application server (EAS) and/or any other type of network node that may transmit PDU sets. The second network node may be, be similar to, include, or be included in, a base station (e.g., a gNB), and/or any other type of network node that may receive PDU sets and/or transmit PDU sets to a UE. In some aspects, the first network node 502 and/or the second network node 504 may be, be similar to, include, or be included in, the network node 110 depicted in FIGS. 1 and 2 and/or one or more components of the disaggregated base station architecture 300 depicted in FIG. 3. In some aspects, the UE 506 may be, be similar to, include, or be included in, the UE 120 depicted in FIGS. 1-3.

As shown, the first network node 502 may transmit a first PDU set 508 (shown as "PDU set N") to the second network node 504. In some cases, PDU set information 510 (information about a PDU set) can be carried in an RTP header extension of one or more of the RTP packets 512 of the PDU set 508 to allow the UPF 514 to extract the PDU set information 510 and convey it via a general packet radio service (GPRS) tunnelling protocol (GTP)-U header to the second network node 504 (e.g., a gNB) for resource allocation in the RAN. In some cases, the PDU set information 510 includes a PDU Set Sequence Number (PSSN) (e.g., 10 bits), a PDU Set Importance (PSI) (e.g., 4 bits), a PDU Set Size (PSSize) (e.g., 24 bits), an end PDU of the PDU Set (E) (e.g., 1 bit), and end of a data burst (EDB) (e.g., 3 bits), and/or a PDU Sequence Number within a PDU Set (PSN) (e.g., 6 bits), among other examples.

In some cases, however, the RTP packet and/or the RTP header may be encrypted. For example, in the case of secure RTP (SRTP), the RTP packet and the RTP header may be encrypted. If the RTP header (e.g., including the header extension) is encrypted, the UPF 514 may not be able to access the PDU Set information 510 from the RTP header extension of the RTP packet 512. In this case, because the second network node 504 may be unaware of the PDU set information 510 prior to transmitting the PDU set 508 to the UE 506, the second network node 504 may allocate extra resources to be ensure sufficient resources are allocated for transmission of the PDU set 508. For example, without the PDU set information, the second network node 504 may be unaware of the PDU set size and/or a time of arrival of a first packet 512 of the PDU set 508. As a result, encryption of RTP headers (and/or packets) may result in inefficiencies in resource allocation.

Some aspects of the techniques and apparatuses described herein may facilitate signaling PDU set information in a way that enables a network node to allocate resources appropriately for transmission of the corresponding PDU set to a UE. For example, in some aspects, PDU set information associated with a PDU set N+1 516 may be included within an earlier transmitted PDU set (e.g., PDU set N 508). The PDU set information associated with the PDU set N+1 516 may be predicted by the first network node 502. For example, the PDU information may be predicted in association with a compression and/or encoding process associated with a prior PDU set (e.g., the PDU set N 508).

In some aspects, to assist the second network node 504 to do resource allocation at an appropriate time (e.g., not too early and not too late) for PDU set N+1, the PDU set information 510 may include information about the expected arrival time of the PDU set N+1. For example, the expected arrival time may be indicated in terms of a time gap between the last PDU (e.g., packet) of the PDU set N and the first PDU of the PDU set N+1. The expected arrival time may be quantized and, in some aspects, the value zero may be one of the quantized values. In some aspects, multiple PDU sets may be transmitted in a data burst (e.g., the multiple PDU sets may be transmitted back to back or with a very small time gap between them). The PDU set information 510 may include information associated with the expected arrival time of the data burst, and the aggregate PDU set size of the multiple PDU sets in the data burst. In some aspects, the PDU set information 510 may include a predicted end of PDU Set (E) for PDU set N+1 (e.g., with a number of PDUs). For example, the end PDU of the PDU Set N+1 may be x PDUs after the first PDU of the PDU set N+1. In some aspects, the predicted PDU set information may predict the end of a data burst (EDB) (e.g., the end of a data burst may be y PDUs after the first PDU of the PDU set N+1). In some aspects, the PDU set information 510 may include information about both PDU set N and PDU set N+1. For example, the PDU set information 510 may include the PSSN, PSI, PSSize and the expected arrival time for PDU set N+1 and the PSSN and/or am end of PDU Set for PDU set N, among other examples.

As indicated above, FIG. 5 is provided as an example. Other examples may differ from what is described with regard to FIG. 5.

Figure 6:
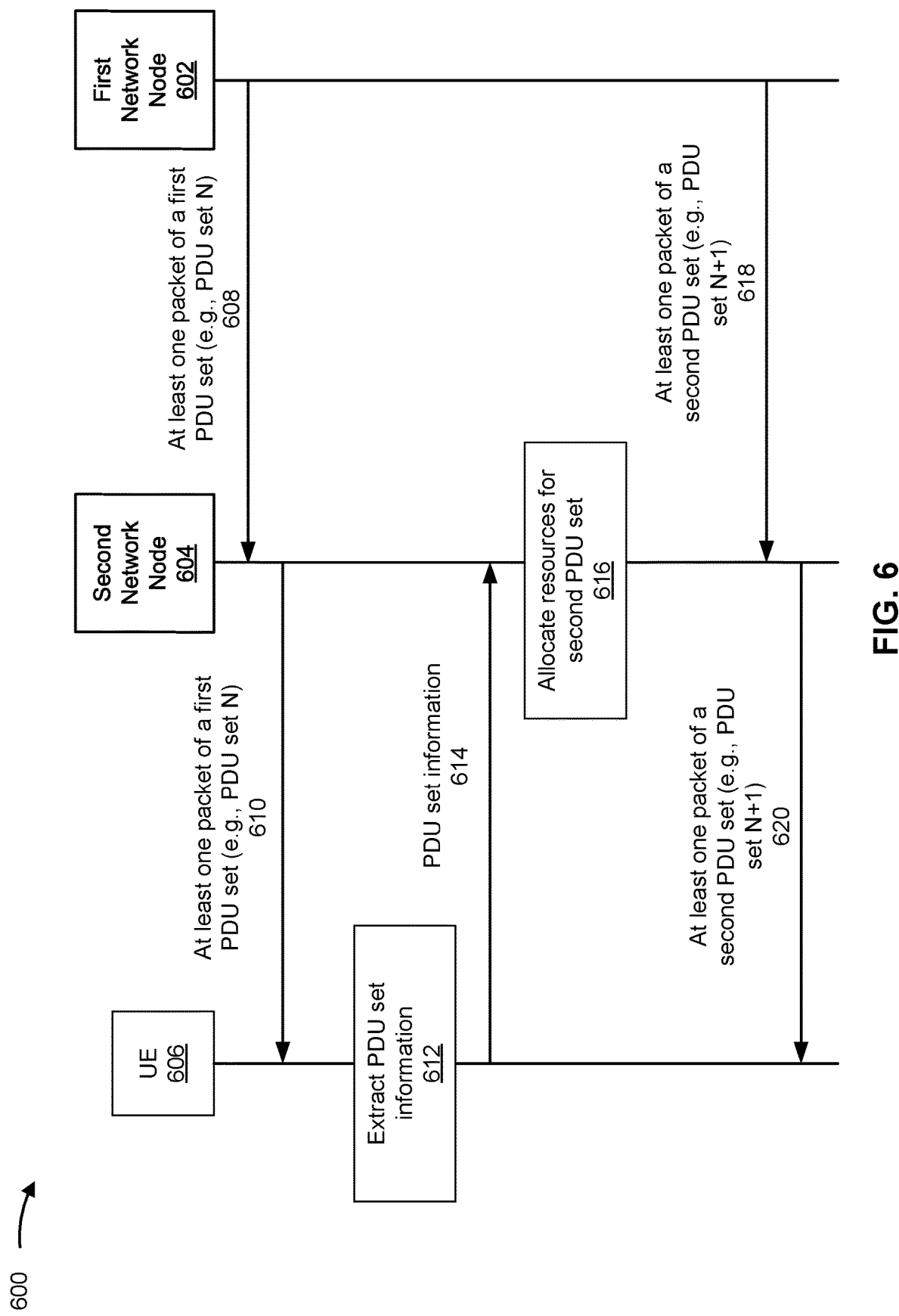
FIG. 6 is a flow diagram illustrating an example associated with signaling of PDU set information.

FIG. 6 is a flow diagram illustrating an example 600 associated with signaling of PDU set information. As shown, a first network node 602 may communicate with a second network node 604, and the second network node 604 may communicate with a UE 606. In some aspects, the first network node 602 may be, be similar to, include, or be included in, the first network node 502 depicted in FIG. 5. In some aspects, the second network node 604 may be, be similar to, include, or be included in, the second network node 504 depicted in FIG. 5. In some aspects, the first network node 602 and/or the second network node 604 may be, be similar to, include, or be included in, the network node 110 depicted in FIGS. 1 and 2 and/or one or more components of the disaggregated base station architecture 300 depicted in FIG. 3. In some aspects, the UE 606 may be, be similar to, include, or be included in, the UE 120 depicted in FIGS. 1-3

As shown by reference number 608, the first network node 602 may transmit, and the second network node 604 may receive, at least one packet of a first PDU set. In some aspects, the first network node 602 may transmit the at least one packet of the first PDU set during a first time period. The at least one packet of the first PDU set may include PDU set information associated with a second PDU set. The second PDU set may be any PDU set that is to be transmitted at a time subsequent to the first time period during which the first PDU set is transmitted. For example, the first PDU set may be a PDU set N and the second PDU set may be a PDU set N+1, a PDU set N+2, and/or a PDU set N+3, among other examples. In some aspects, the at least one packet of the first PDU set may indicate an identifier associated with the second PDU set. The identifier may include a PSSN associated with the second PDU set.

In some aspects, the PDU set information may indicate a PSSN associated with the second PDU set, a PSI associated with the second PDU set, a PSSize associated with the second PDU set, an EDB associated with the second PDU set, a PSN associated with the second PDU set, and/or an expected arrival time associated with the second PDU set, among other examples. In some aspects, since the PDU set information may include estimated values (e.g., an estimated PDU set size), the first network node 602 may update the indicated values as more accurate estimates are obtained. For example, in some aspects, the PDU set information may indicate a first PDU set size and the first network node 602 may determine an updated PDU set size associated with the second PDU set. The first network node 602 may transmit an indication of the updated PDU set size to the second network node 604. For example, the first network node 602 may transmit the first PDU set size in a first packet of the first PDU set and the updated PDU set size in a second packet of the first PDU set.

In some aspects, the at least one packet of the first PDU set may be dummy packet (e.g., a dedicated packet), used only for transmitting the PDU set information. In some aspects, the PDU set may be a dummy PDU set. For example, the at least one packet of the first PDU set may omit application data. In some aspects, the at least one packet of the first PDU set may include padding bits in lieu of application data. In some other aspects, the at least one packet of the first PDU set may include application data.

In some aspects, the at least one packet of the first PDU set may include an encrypted portion that includes at least a portion of the PDU set information. In some aspects, the at least one packet of the first PDU set may include at least one RTP packet. In some aspects, the RTP packet may be an SRTP packet. In some aspects, the at least one RTP packet may include an RTP header extension element that includes at least a portion of the PDU set information. The RTP header extension element may be encrypted. In some aspects, the at least one RTP packet may include an RTP payload that includes at least a portion of the PDU set information. The portion of the PDU set information may be encrypted (e.g., the payload or a portion thereof may be encrypted).

In some aspects, the at least one packet of the first PDU set may include a last-transmitted packet of the first PDU set. In that case, the estimated PDU set information may be more accurate than PDU set information estimated earlier (e.g., and transmitted in an earlier-transmitted packet) due to being estimated closer in time to the processing (e.g., compression and/or encoding) of the second PDU set. In some aspects, the at least one packet of the first PDU set may include a first-transmitted packet of the first PDU set. In that case, the second network node 604 may have more time to allocate resources than the second network node 604 may have if the PDU information is transmitted in a later-transmitted packet.

In some aspects, as shown by reference number 610, the second network node 604 may transmit, and the UE 606 may receive, the at least one packet of the first PDU set. In some aspects, the second network node 604 may serve multiple traffic flows (e.g., QoS flows) that the second network node 604 can identify, and the first PDU set may belong to one of the traffic flows. In this case, the second network node 604 may signal the association of the first PDU set and the one of the traffic flows. For example, the association may be indicated with the QoS flow identifier (QFI) in the SDAP packet header of a SDAP packet carrying the first PDU set because the first PDU set and the second PDU set may belong to a same QoS flow. As shown by reference number 612, the UE 606 may extract the PDU set information from the at least one packet of the first PDU set and may extract the identifier of the associated traffic flow and, as shown by reference number 614, the UE 606 may transmit, and the second network node 604 may receive, the PDU set information and the identifier of the associated traffic flow. In some aspects, the UE 606 may transmit a full set of extracted PDU set information and, in some other aspects, the UE 606 may transmit one or more portions of the PDU set information. For example, in some aspects, the UE 606 may transmit an update to previously-transmitted PDU set information. The update may include one or more updated estimated values associated with the second PDU set and/or may include a set of updated values associated with an additional PDU set. In some aspects, the UE 606 may transmit the PDU set information and/or updated PDU set information (e.g., an indication of an updated PDU set size) via a UE assistance information (UAI) RRC message.

As shown by reference number 616, the second network node 604 may allocate resources for the second PDU set. For example, the second network node 604 may allocate the resources in association with the PDU set information. As shown by reference number 618, the first network node 602 may transmit, and the second network node 604 may receive, the second PDU set. As shown by reference number 620, the second network node 604 may transmit, and the UE 602 may receive, the second PDU set. For example, the second network node 604 may transmit the second PDU set in association with the allocated resources.

As indicated above, FIG. 6 is provided as an example. Other examples may differ from what is described with regard to FIG. 6.

Figure 7:
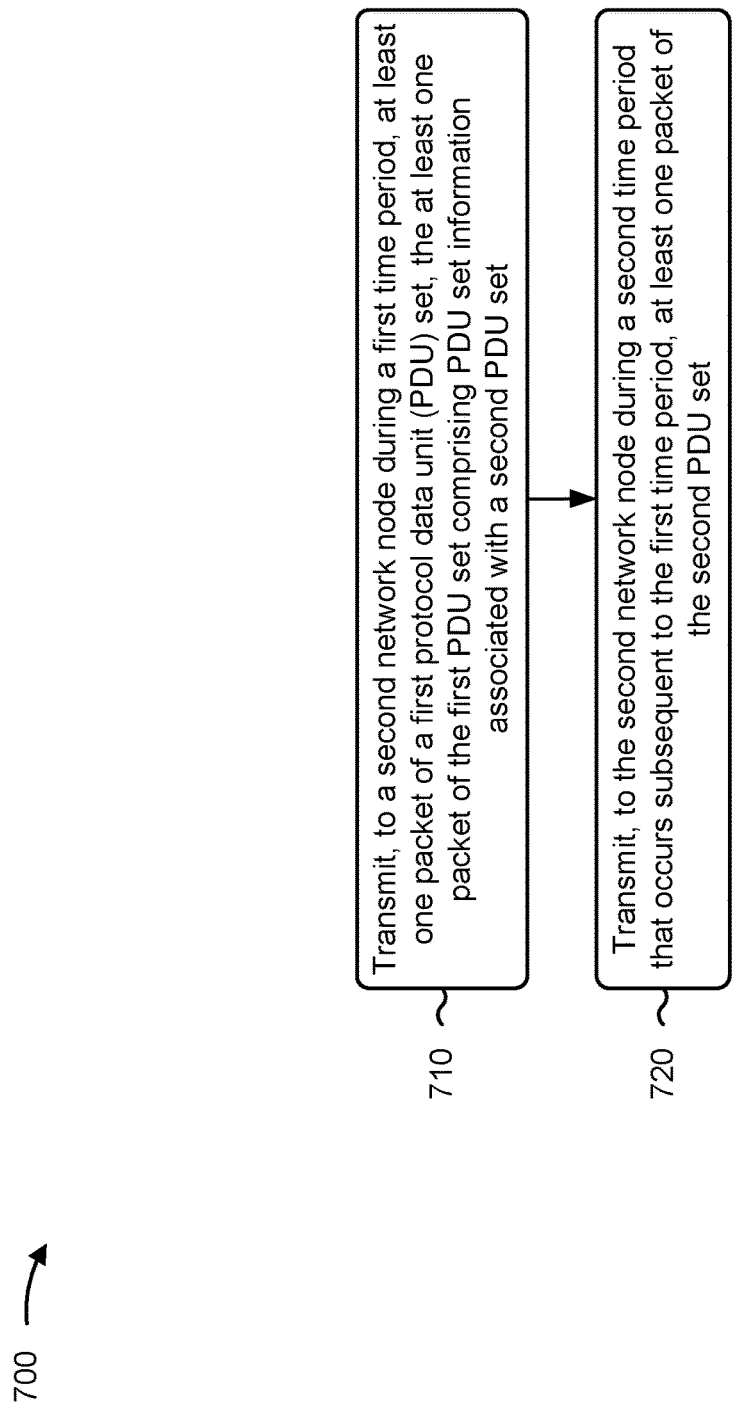
FIG. 7 is a diagram illustrating an example process performed, for example, at a first network node or an apparatus of a first network node, in accordance with the present disclosure.

FIG. 7 is a diagram illustrating an example process 700 performed, for example, at a first network node or an apparatus of a first network node, in accordance with the present disclosure. Example process 700 is an example where the apparatus or the first network node (e.g., first network node 602) performs operations associated with signaling of PDU set information.

As shown in FIG. 7, in some aspects, process 700 may include transmitting, to a second network node during a first time period, at least one packet of a first PDU set, the at least one packet of the first PDU set comprising PDU set information associated with a second PDU set (block 710). For example, the first network node (e.g., using transmission component 1004 and/or communication manager 1006, depicted in FIG. 10) may transmit, to a second network node during a first time period, at least one packet of a first PDU set, the at least one packet of the first PDU set comprising PDU set information associated with a second PDU set, as described in connection with FIG. 6.

As further shown in FIG. 7, in some aspects, process 700 may include transmitting, to the second network node during a second time period that occurs subsequent to the first time period, at least one packet of the second PDU set (block 720). For example, the first network node (e.g., using transmission component 1004 and/or communication manager 1006, depicted in FIG. 10) may transmit, to the second network node during a second time period that occurs subsequent to the first time period, at least one packet of the second PDU set, as described in connection with FIG. 6.

Process 700 may include additional aspects, such as any single aspect or any combination of aspects described below and/or in connection with one or more other processes described elsewhere herein.

In a first aspect, the at least one packet of the first PDU set indicates an identifier associated with the second PDU set, as described in connection with FIG. 6. In a second aspect, alone or in combination with the first aspect, the identifier comprises a PSSN, as described in connection with FIG. 6. In a third aspect, alone or in combination with one or more of the first and second aspects, the PDU set information indicates at least one of a PSSN associated with the second PDU set, a PSI associated with the second PDU set, a PSSize associated with the second PDU set, an EDB associated with the second PDU set, or a PSN, as described in connection with FIG. 6. In a fourth aspect, alone or in combination with one or more of the first through third aspects, the PDU set information indicates the PDU set size, and process 700 includes transmitting at least one additional packet of the first PDU set, the at least one additional packet indicating an updated PDU set size associated with the second PDU set, as described in connection with FIG. 6.

In a fifth aspect, alone or in combination with one or more of the first through fourth aspects, the at least one packet of the first PDU set comprises at least one RTP packet, wherein the RTP packet may include an SRTP packet, as described in connection with FIG. 6. In a sixth aspect, alone or in combination with one or more of the first through fifth aspects, the at least one RTP packet comprises an RTP header extension element that includes at least a portion of the PDU set information, as described in connection with FIG. 6. In a seventh aspect, alone or in combination with one or more of the first through sixth aspects, the RTP header extension element is encrypted, as described in connection with FIG. 6. In an eighth aspect, alone or in combination with one or more of the first through seventh aspects, the at least one RTP packet comprises an RTP payload that includes at least a portion of the PDU set information, as described in connection with FIG. 6. In a ninth aspect, alone or in combination with one or more of the first through eighth aspects, the portion of the PDU set information is encrypted, as described in connection with FIG. 6.

In a tenth aspect, alone or in combination with one or more of the first through ninth aspects, the at least one packet of the first PDU set comprises a last-transmitted packet of the first PDU set, as described in connection with FIG. 6. In an eleventh aspect, alone or in combination with one or more of the first through tenth aspects, the at least one packet of the first PDU set comprises a first-transmitted packet of the first PDU set, as described in connection with FIG. 6. In a twelfth aspect, alone or in combination with one or more of the first through eleventh aspects, the at least one packet of the first PDU set comprises an encrypted portion that includes at least a portion of the PDU set information, as described in connection with FIG. 6. In a thirteenth aspect, alone or in combination with one or more of the first through twelfth aspects, the at least one packet of the first PDU set omits application data, as described in connection with FIG. 6. In a fourteenth aspect, alone or in combination with one or more of the first through thirteenth aspects, the at least one packet of the first PDU set comprises padding bits in lieu of application data, as described in connection with FIG. 6.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
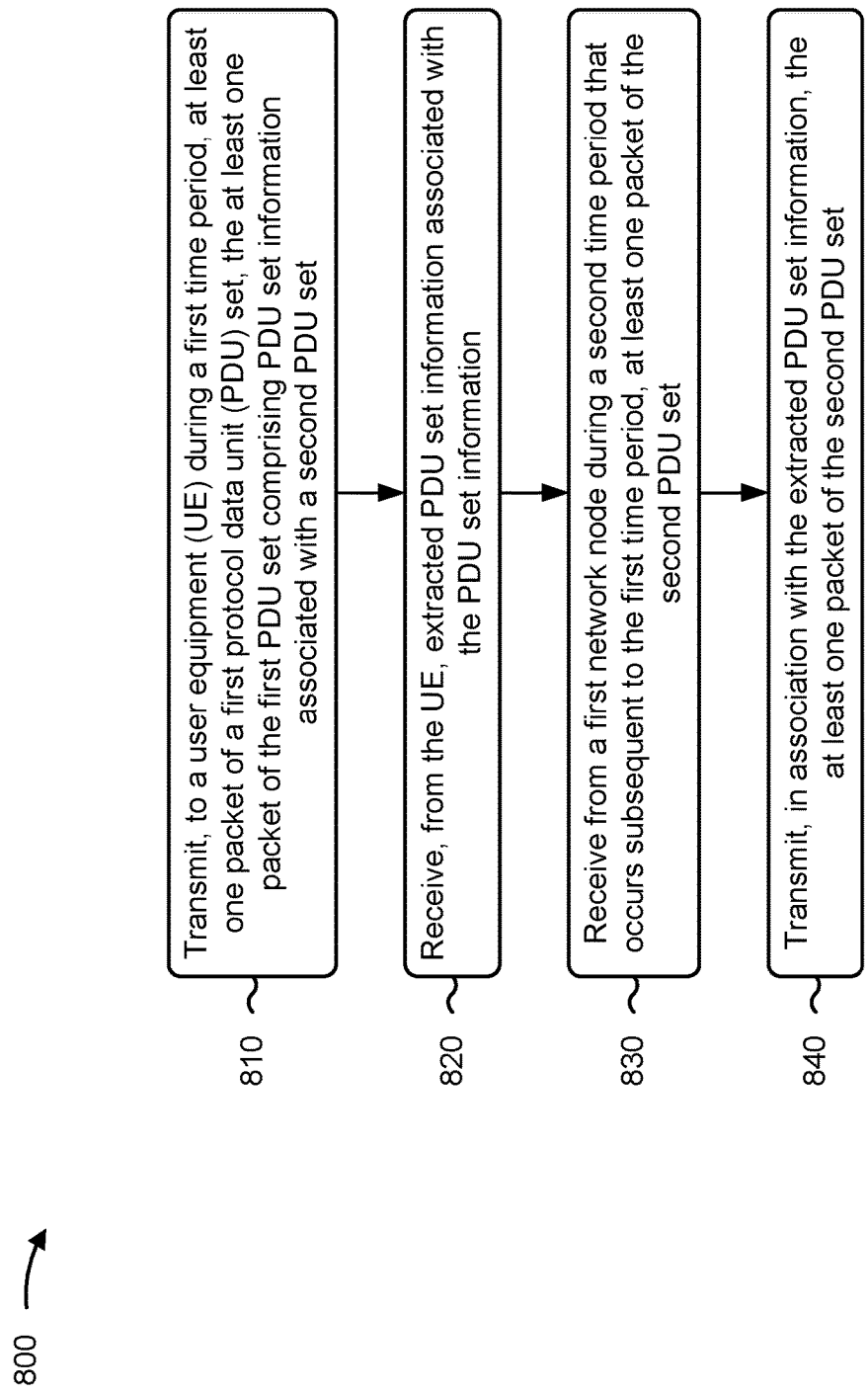
FIG. 8 is a diagram illustrating an example process performed, for example, at a second network node or an apparatus of a second network node, in accordance with the present disclosure.

FIG. 8 is a diagram illustrating an example process 800 performed, for example, at a second network node or an apparatus of a second network node, in accordance with the present disclosure. Example process 800 is an example where the apparatus or the second network node (e.g., second network node 604) performs operations associated with signaling of PDU set information.

As shown in FIG. 8, in some aspects, process 800 may include transmitting, to a UE during a first time period, at least one packet of a first PDU set, the at least one packet of the first PDU set comprising PDU set information associated with a second PDU set (block 810). For example, the second network node (e.g., using transmission component 1004 and/or communication manager 1006, depicted in FIG. 10) may transmit, to a UE during a first time period, at least one packet of a first PDU set, the at least one packet of the first PDU set comprising PDU set information associated with a second PDU set, as described in connection with FIG. 6.

As further shown in FIG. 8, in some aspects, process 800 may include receiving, from the UE, extracted PDU set information associated with the PDU set information (block 820). For example, the second network node (e.g., using reception component 1002 and/or communication manager 1006, depicted in FIG. 10) may receive, from the UE, extracted PDU set information associated with the PDU set information, as described in connection with FIG. 6.

As further shown in FIG. 8, in some aspects, process 800 may include receiving from a first network node during a second time period that occurs subsequent to the first time period, at least one packet of the second PDU set (block 830). For example, the second network node (e.g., using reception component 1002 and/or communication manager 1006, depicted in FIG. 10) may receive from a first network node during a second time period that occurs subsequent to the first time period, at least one packet of the second PDU set, as described in connection with FIG. 6.

As further shown in FIG. 8, in some aspects, process 800 may include transmitting, in association with the extracted PDU set information, the at least one packet of the second PDU set (block 840). For example, the second network node (e.g., using transmission component 1004 and/or communication manager 1006, depicted in FIG. 10) may transmit, in association with the extracted PDU set information, the at least one packet of the second PDU set, as described in connection with FIG. 6.

Process 800 may include additional aspects, such as any single aspect or any combination of aspects described below and/or in connection with one or more other processes described elsewhere herein.

In a first aspect, the at least one packet of the first PDU set indicates an identifier associated with the second PDU set, as described in connection with FIG. 6. In a second aspect, alone or in combination with the first aspect, the identifier comprises a PSSN, as described in connection with FIG. 6. In a third aspect, alone or in combination with one or more of the first and second aspects, the PDU set information indicates at least one of a PSSN associated with the second PDU set, a PSI associated with the second PDU set, a PSSize associated with the second PDU set, an EDB associated with the second PDU set, or a PSN, as described in connection with FIG. 6. In a fourth aspect, alone or in combination with one or more of the first through third aspects, the PDU set information indicates the PDU set size, and process 800 includes receiving, from the UE, an indication of an updated PDU set size associated with the second PDU set, as described in connection with FIG. 6. In a fifth aspect, alone or in combination with one or more of the first through fourth aspects, receiving the indication of the updated PDU set size comprises receiving a UAI RRC message comprising the indication of the updated PDU set size, as described in connection with FIG. 6.

In a sixth aspect, alone or in combination with one or more of the first through fifth aspects, the at least one packet of the first PDU set comprises at least one RTP packet, where the RTP packet may include an SRTP packet, as described in connection with FIG. 6. In a seventh aspect, alone or in combination with one or more of the first through sixth aspects, the at least one RTP packet comprises an RTP header extension element that includes at least a portion of the PDU set information, as described in connection with FIG. 6. In an eighth aspect, alone or in combination with one or more of the first through seventh aspects, the RTP header extension element is encrypted, as described in connection with FIG. 6. In a ninth aspect, alone or in combination with one or more of the first through eighth aspects, the at least one RTP packet comprises an RTP payload that includes at least a portion of the PDU set information, as described in connection with FIG. 6. In a tenth aspect, alone or in combination with one or more of the first through ninth aspects, the portion of the PDU set information is encrypted, as described in connection with FIG. 6.

In an eleventh aspect, alone or in combination with one or more of the first through tenth aspects, the at least one packet of the first PDU set comprises a last-transmitted packet of the first PDU set, as described in connection with FIG. 6. In a twelfth aspect, alone or in combination with one or more of the first through eleventh aspects, the at least one packet of the first PDU set comprises a first-transmitted packet of the first PDU set, as described in connection with FIG. 6. In a thirteenth aspect, alone or in combination with one or more of the first through twelfth aspects, the at least one packet of the first PDU set comprises an encrypted portion that includes at least a portion of the PDU set information, as described in connection with FIG. 6. In a fourteenth aspect, alone or in combination with one or more of the first through thirteenth aspects, the at least one packet of the first PDU set omits application data, as described in connection with FIG. 6. In a fifteenth aspect, alone or in combination with one or more of the first through fourteenth aspects, the at least one packet of the first PDU set comprises padding bits in lieu of application data, as described in connection with FIG. 6.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
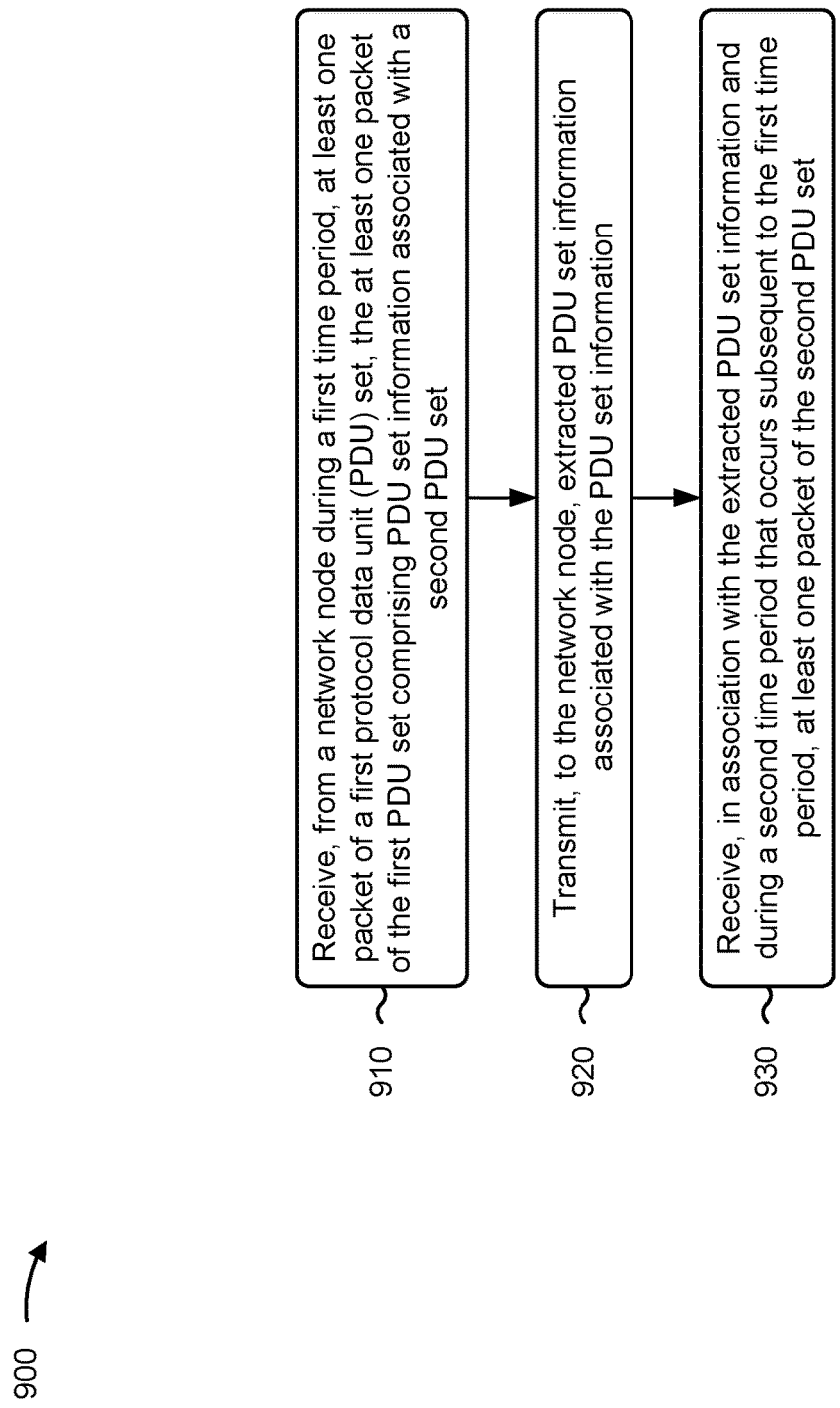
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 606) performs operations associated with signaling of PDU set information.

As shown in FIG. 9, in some aspects, process 900 may include receiving, from a network node during a first time period, at least one packet of a first PDU set, the at least one packet of the first PDU set comprising PDU set information associated with a second PDU set (block 910). For example, the UE (e.g., using reception component 1102 and/or communication manager 1106, depicted in FIG. 11) may receive, from a network node during a first time period, at least one packet of a first PDU set, the at least one packet of the first PDU set comprising PDU set information associated with a second PDU set, as described in connection with FIG. 6.

As further shown in FIG. 9, in some aspects, process 900 may include transmitting, to the network node, extracted PDU set information associated with the PDU set information (block 920). For example, the UE (e.g., using transmission component 1104 and/or communication manager 1106, depicted in FIG. 11) May transmit, to the network node, extracted PDU set information associated with the PDU set information, as described in connection with FIG. 6.

As further shown in FIG. 9, in some aspects, process 900 may include receiving, in association with the extracted PDU set information and during a second time period that occurs subsequent to the first time period, at least one packet of the second PDU set (block 930). For example, the UE (e.g., using reception component 1102 and/or communication manager 1106, depicted in FIG. 11) may receive, in association with the extracted PDU set information and during a second time period that occurs subsequent to the first time period, at least one packet of the second PDU set, as described in connection with FIG. 6.

Process 900 may include additional aspects, such as any single aspect or any combination of aspects described below and/or in connection with one or more other processes described elsewhere herein.

In a first aspect, the at least one packet of the first PDU set indicates an identifier associated with the second PDU set, as described in connection with FIG. 6. In a second aspect, alone or in combination with the first aspect, the identifier comprises a PSSN, as described in connection with FIG. 6. In a third aspect, alone or in combination with one or more of the first and second aspects, the PDU set information indicates at least one of a PSSN associated with the second PDU set, a PSI associated with the second PDU set, a PSSize associated with the second PDU set, an EDB associated with the second PDU set, or a PSN, as described in connection with FIG. 6. In a fourth aspect, alone or in combination with one or more of the first through third aspects, the PDU set information indicates the PDU set size, and process 900 includes receiving, from the network node, at least one additional packet of the first PDU set, the at least one additional packet indicating an updated PDU set size associated with the second PDU set, and transmitting, to the network node, an indication of an updated PDU set size associated with the second PDU set, as described in connection with FIG. 6. In a fifth aspect, alone or in combination with one or more of the first through fourth aspects, transmitting the indication of the updated PDU set size comprises transmitting a UAI RRC message comprising the indication of the updated PDU set size, as described in connection with FIG. 6.

In a sixth aspect, alone or in combination with one or more of the first through fifth aspects, the at least one packet of the first PDU set comprises at least one RTP packet, wherein the RTP packet may include an SRTP packet, as described in connection with FIG. 6. In a seventh aspect, alone or in combination with one or more of the first through sixth aspects, the at least one RTP packet comprises an RTP header extension element that includes at least a portion of the PDU set information, as described in connection with FIG. 6. In an eighth aspect, alone or in combination with one or more of the first through seventh aspects, the RTP header extension element is encrypted, as described in connection with FIG. 6. In a ninth aspect, alone or in combination with one or more of the first through eighth aspects, the at least one RTP packet comprises an RTP payload that includes at least a portion of the PDU set information, as described in connection with FIG. 6. In a tenth aspect, alone or in combination with one or more of the first through ninth aspects, the portion of the PDU set information is encrypted, as described in connection with FIG. 6.

In an eleventh aspect, alone or in combination with one or more of the first through tenth aspects, the at least one packet of the first PDU set comprises a last-transmitted packet of the first PDU set, as described in connection with FIG. 6. In a twelfth aspect, alone or in combination with one or more of the first through eleventh aspects, the at least one packet of the first PDU set comprises a first-transmitted packet of the first PDU set, as described in connection with FIG. 6. In a thirteenth aspect, alone or in combination with one or more of the first through twelfth aspects, the at least one packet of the first PDU set comprises an encrypted portion that includes at least a portion of the PDU set information, as described in connection with FIG. 6. In a fourteenth aspect, alone or in combination with one or more of the first through thirteenth aspects, the at least one packet of the first PDU set omits application data, as described in connection with FIG. 6. In a fifteenth aspect, alone or in combination with one or more of the first through fourteenth aspects, the at least one packet of the first PDU set comprises padding bits in lieu of application data, as described in connection with FIG. 6.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
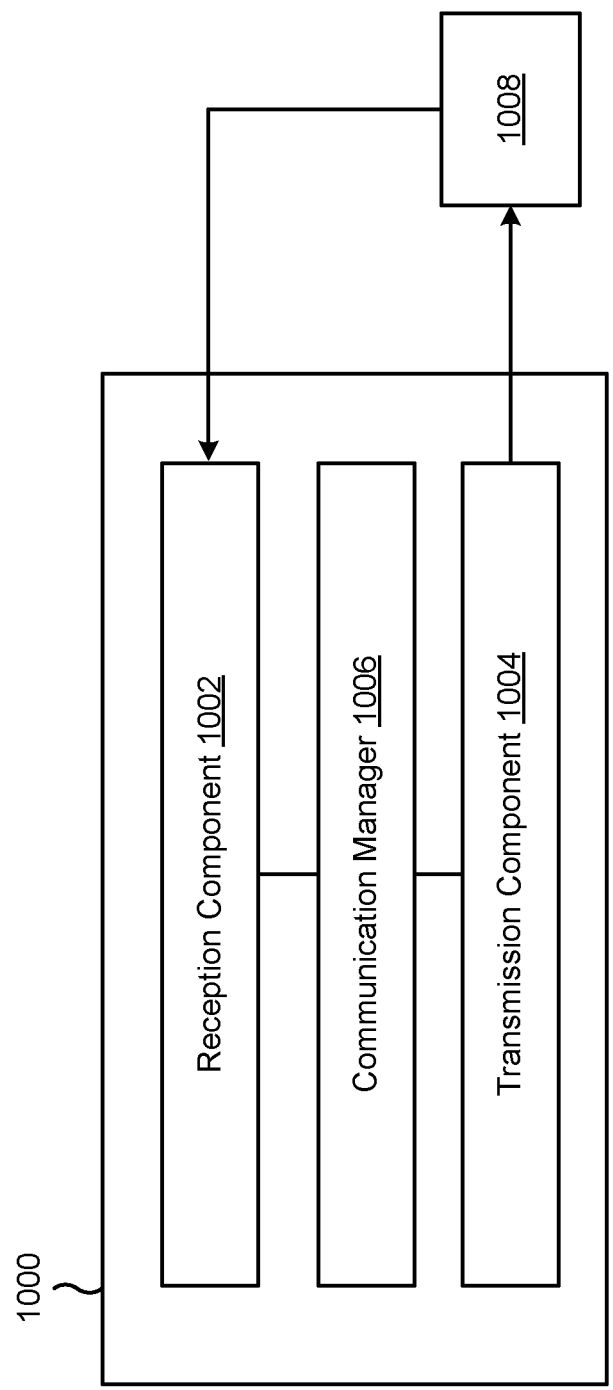
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a second network node during a first time period, at least one packet of a first PDU set, the at least one packet of the first PDU set comprising PDU set information associated with a second PDU set. The transmission component 1004 may transmit, to the second network node during a second time period that occurs subsequent to the first time period, at least one packet of the second PDU set.

The transmission component 1004 may transmit, to a UE during a first time period, at least one packet of a first PDU set, the at least one packet of the first PDU set comprising PDU set information associated with a second PDU set. The reception component 1002 may receive, from the UE, extracted PDU set information associated with the PDU set information. The reception component 1002 may receive from a first network node during a second time period that occurs subsequent to the first time period, at least one packet of the second PDU set. The transmission component 1004 may transmit, in association with the extracted PDU set information, the at least one packet of the second PDU set.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
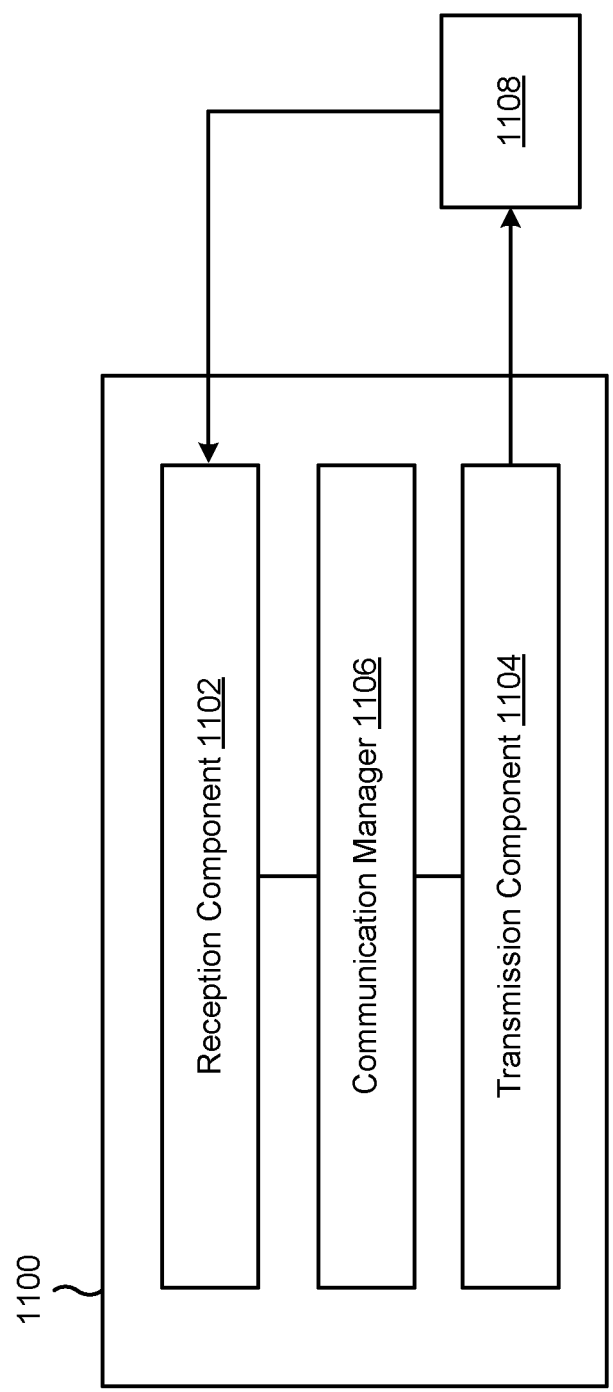
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 6. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a network node during a first time period, at least one packet of a first PDU set, the at least one packet of the first PDU set comprising PDU set information associated with a second PDU set. The transmission component 1104 may transmit, to the network node, extracted PDU set information associated with the PDU set information. The reception component 1102 may receive, in association with the extracted PDU set information and during a second time period that occurs subsequent to the first time period, at least one packet of the second PDU set.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first network node, comprising: transmitting, to a second network node during a first time period, at least one packet of a first protocol data unit (PDU) set, the at least one packet of the first PDU set comprising PDU set information associated with a second PDU set; and transmitting, to the second network node during a second time period that occurs subsequent to the first time period, at least one packet of the second PDU set.

Aspect 2: The method of Aspect 1, wherein the at least one packet of the first PDU set indicates an identifier associated with the second PDU set.

Aspect 3: The method of Aspect 2, wherein the identifier comprises a PDU set sequence number (PSSN).

Aspect 4: The method of any of Aspects 1-3, wherein the PDU set information indicates at least one of: a PDU set sequence number (PSSN) associated with the second PDU set, a PDU set importance (PSI) associated with the second PDU set, a PDU set size (PSSize) associated with the second PDU set, an end of a data burst (EDB) associated with the second PDU set, or a PDU sequence number within the PDU set (PSN).

Aspect 5: The method of Aspect 4, wherein the PDU set information indicates the PDU set size, the method further comprising transmitting at least one additional packet of the first PDU set, the at least one additional packet indicating an updated PDU set size associated with the second PDU set.

Aspect 6: The method of any of Aspects 1-5, wherein the at least one packet of the first PDU set comprises at least one of a real-time transport protocol (RTP) packet or a secure RTP (SRTP) packet.

Aspect 7: The method of Aspect 6, wherein the at least one RTP packet comprises an RTP header extension element that includes at least a portion of the PDU set information.

Aspect 8: The method of Aspect 7, wherein the RTP header extension element is encrypted.

Aspect 9: The method of any of Aspects 6-8, wherein the at least one RTP packet comprises an RTP payload that includes at least a portion of the PDU set information.

Aspect 10: The method of Aspect 8, wherein the portion of the PDU set information is encrypted.

Aspect 11: The method of any of Aspects 1-10, wherein the at least one packet of the first PDU set comprises a last-transmitted packet of the first PDU set.

Aspect 12: The method of any of Aspects 1-11, wherein the at least one packet of the first PDU set comprises a first-transmitted packet of the first PDU set.

Aspect 13: The method of any of Aspects 1-12, wherein the at least one packet of the first PDU set comprises an encrypted portion that includes at least a portion of the PDU set information.

Aspect 14: The method of any of Aspects 1-13, wherein the at least one packet of the first PDU set omits application data.

Aspect 15: The method of any of Aspects 1-14, wherein the at least one packet of the first PDU set comprises padding bits in lieu of application data.

Aspect 16: A method of wireless communication performed by a second network node, comprising: transmitting, to a user equipment (UE) during a first time period, at least one packet of a first protocol data unit (PDU) set, the at least one packet of the first PDU set comprising PDU set information associated with a second PDU set; receiving, from the UE, extracted PDU set information associated with the PDU set information; receiving from a first network node during a second time period that occurs subsequent to the first time period, at least one packet of the second PDU set; and transmitting, in association with the extracted PDU set information, the at least one packet of the second PDU set.

Aspect 17: The method of Aspect 16, wherein the at least one packet of the first PDU set indicates an identifier associated with the second PDU set.

Aspect 18: The method of Aspect 17, wherein the identifier comprises a PDU set sequence number (PSSN).

Aspect 19: The method of any of Aspects 16-18, wherein the PDU set information indicates at least one of: a PDU set sequence number (PSSN) associated with the second PDU set, a PDU set importance (PSI) associated with the second PDU set, a PDU set size (PSSize) associated with the second PDU set, an end of a data burst (EDB) associated with the second PDU set, or a PDU sequence number within the PDU set (PSN).

Aspect 20: The method of Aspect 19, wherein the PDU set information indicates the PDU set size, the method further comprising receiving, from the UE, an indication of an updated PDU set size associated with the second PDU set.

Aspect 21: The method of Aspect 20, wherein receiving the indication of the updated PDU set size comprises receiving a UE assistance information (UAI) radio resource control (RRC) message comprising the indication of the updated PDU set size.

Aspect 22: The method of any of Aspects 16-21, wherein the at least one packet of the first PDU set comprises at least one of a real-time transport protocol (RTP) packet or a secure RTP (SRTP) packet.

Aspect 23: The method of Aspect 22, wherein the at least one RTP packet comprises an RTP header extension element that includes at least a portion of the PDU set information.

Aspect 24: The method of Aspect 23, wherein the RTP header extension element is encrypted.

Aspect 25: The method of any of Aspects 22-24, wherein the at least one RTP packet comprises an RTP payload that includes at least a portion of the PDU set information.

Aspect 26: The method of Aspect 25, wherein the portion of the PDU set information is encrypted.

Aspect 27: The method of any of Aspects 16-26, wherein the at least one packet of the first PDU set comprises a last-transmitted packet of the first PDU set.

Aspect 28: The method of any of Aspects 16-27, wherein the at least one packet of the first PDU set comprises a first-transmitted packet of the first PDU set.

Aspect 29: The method of any of Aspects 16-28, wherein the at least one packet of the first PDU set comprises an encrypted portion that includes at least a portion of the PDU set information.

Aspect 30: The method of any of Aspects 16-29, wherein the at least one packet of the first PDU set omits application data.

Aspect 31: The method of any of Aspects 16-30, wherein the at least one packet of the first PDU set comprises padding bits in lieu of application data.

Aspect 32: A method of wireless communication performed by a user equipment (UE), comprising: receiving, from a network node during a first time period, at least one packet of a first protocol data unit (PDU) set, the at least one packet of the first PDU set comprising PDU set information associated with a second PDU set; transmitting, to the network node, extracted PDU set information associated with the PDU set information; and receiving, in association with the extracted PDU set information and during a second time period that occurs subsequent to the first time period, at least one packet of the second PDU set.

Aspect 33: The method of Aspect 32, wherein the at least one packet of the first PDU set indicates an identifier associated with the second PDU set.

Aspect 34: The method of Aspect 33, wherein the identifier comprises a PDU set sequence number (PSSN).

Aspect 35: The method of any of Aspects 32-34, wherein the PDU set information indicates at least one of: a PDU set sequence number (PSSN) associated with the second PDU set, a PDU set importance (PSI) associated with the second PDU set, a PDU set size (PSSize) associated with the second PDU set, an end of a data burst (EDB) associated with the second PDU set, or a PDU sequence number within the PDU set (PSN).

Aspect 36: The method of Aspect 35, wherein the PDU set information indicates the PDU set size, the method further comprising: receiving, from the network node, at least one additional packet of the first PDU set, the at least one additional packet indicating an updated PDU set size associated with the second PDU set; and transmitting, to the network node, an indication of an updated PDU set size associated with the second PDU set.

Aspect 37: The method of Aspect 36, wherein transmitting the indication of the updated PDU set size comprises transmitting a UE assistance information (UAI) radio resource control (RRC) message comprising the indication of the updated PDU set size.

Aspect 38: The method of any of Aspects 32-37, wherein the at least one packet of the first PDU set comprises at least one real-time transport protocol (RTP) packet, wherein the RTP packet may include a secure RTP (SRTP) packet.

Aspect 39: The method of Aspect 38, wherein the at least one RTP packet comprises an RTP header extension element that includes at least a portion of the PDU set information.

Aspect 40: The method of Aspect 39, wherein the RTP header extension element is encrypted.

Aspect 41: The method of any of Aspects 38-40, wherein the at least one RTP packet comprises an RTP payload that includes at least a portion of the PDU set information.

Aspect 42: The method of Aspect 41, wherein the portion of the PDU set information is encrypted.

Aspect 43: The method of any of Aspects 32-42, wherein the at least one packet of the first PDU set comprises a last-transmitted packet of the first PDU set.

Aspect 44: The method of any of Aspects 32-43, wherein the at least one packet of the first PDU set comprises a first-transmitted packet of the first PDU set.

Aspect 45: The method of any of Aspects 32-44, wherein the at least one packet of the first PDU set comprises an encrypted portion that includes at least a portion of the PDU set information.

Aspect 46: The method of any of Aspects 32-45, wherein the at least one packet of the first PDU set omits application data.

Aspect 47: The method of any of Aspects 32-46, wherein the at least one packet of the first PDU set comprises padding bits in lieu of application data.

Aspect 48: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-15.

Aspect 49: An apparatus for wireless communication at a device, the apparatus comprising one or more memories and one or more processors coupled to the one or more memories, the one or more processors configured to cause the device to perform the method of one or more of Aspects 1-15.

Aspect 50: An apparatus for wireless communication, the apparatus comprising at least one means for performing the method of one or more of Aspects 1-15.

Aspect 51: A non-transitory computer-readable medium storing code for wireless communication, the code comprising instructions executable by one or more processors to perform the method of one or more of Aspects 1-15.

Aspect 52: A non-transitory computer-readable medium storing a set of instructions for wireless communication, the set of instructions comprising one or more instructions that, when executed by one or more processors of a device, cause the device to perform the method of one or more of Aspects 1-15.

Aspect 53: A device for wireless communication, the device comprising a processing system that includes one or more processors and one or more memories coupled with the one or more processors, the processing system configured to cause the device to perform the method of one or more of Aspects 1-15.

Aspect 54: An apparatus for wireless communication at a device, the apparatus comprising one or more memories and one or more processors coupled to the one or more memories, the one or more processors individually or collectively configured to cause the device to perform the method of one or more of Aspects 1-15.

Aspect 55: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 16-31.

Aspect 56: An apparatus for wireless communication at a device, the apparatus comprising one or more memories and one or more processors coupled to the one or more memories, the one or more processors configured to cause the device to perform the method of one or more of Aspects 16-31.

Aspect 57: An apparatus for wireless communication, the apparatus comprising at least one means for performing the method of one or more of Aspects 16-31.

Aspect 58: A non-transitory computer-readable medium storing code for wireless communication, the code comprising instructions executable by one or more processors to perform the method of one or more of Aspects 16-31.

Aspect 59: A non-transitory computer-readable medium storing a set of instructions for wireless communication, the set of instructions comprising one or more instructions that, when executed by one or more processors of a device, cause the device to perform the method of one or more of Aspects 16-31.

Aspect 60: A device for wireless communication, the device comprising a processing system that includes one or more processors and one or more memories coupled with the one or more processors, the processing system configured to cause the device to perform the method of one or more of Aspects 16-31.

Aspect 61: An apparatus for wireless communication at a device, the apparatus comprising one or more memories and one or more processors coupled to the one or more memories, the one or more processors individually or collectively configured to cause the device to perform the method of one or more of Aspects 16-31.

Aspect 62: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 32-47.

Aspect 63: An apparatus for wireless communication at a device, the apparatus comprising one or more memories and one or more processors coupled to the one or more memories, the one or more processors configured to cause the device to perform the method of one or more of Aspects 32-47.

Aspect 64: An apparatus for wireless communication, the apparatus comprising at least one means for performing the method of one or more of Aspects 32-47.

Aspect 65: A non-transitory computer-readable medium storing code for wireless communication, the code comprising instructions executable by one or more processors to perform the method of one or more of Aspects 32-47.

Aspect 66: A non-transitory computer-readable medium storing a set of instructions for wireless communication, the set of instructions comprising one or more instructions that, when executed by one or more processors of a device, cause the device to perform the method of one or more of Aspects 32-47.

Aspect 67: A device for wireless communication, the device comprising a processing system that includes one or more processors and one or more memories coupled with the one or more processors, the processing system configured to cause the device to perform the method of one or more of Aspects 32-47.

Aspect 68: An apparatus for wireless communication at a device, the apparatus comprising one or more memories and one or more processors coupled to the one or more memories, the one or more processors individually or collectively configured to cause the device to perform the method of one or more of Aspects 32-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, the one or more processors individually or collectively configured to configured to cause the apparatus to:
receive, from a network node during a first time period, at least one packet of a first protocol data unit (PDU) set, the at least one packet of the first PDU set comprising PDU set information associated with a second PDU set;
transmit, to the network node, a portion of the PDU set information, wherein the portion of the PDU set information comprises a PDU set size (PSSize) associated with the second PDU set; and
receive, in association with the portion of the PDU set information and during a second time period that occurs subsequent to the first time period, at least one packet of the second PDU set.

2. The apparatus of claim 1, wherein the at least one packet of the first PDU set indicates an identifier associated with the second PDU set.

3. The apparatus of claim 2, wherein the identifier comprises a PDU set sequence number (PSSN).

4. The apparatus of claim 3, wherein the at least one packet of the first PDU set comprises an encrypted portion that includes the portion of the PDU set information.

5. The apparatus of claim 1, wherein the PDU set information indicates the PDU set size (PSSize) associated with the second PDU set and one or more of:
a PDU set sequence number (PSSN) associated with the second PDU set,
a PDU set importance (PSI) associated with the second PDU set,
an end of a data burst (EDB) associated with the second PDU set, or
a PDU sequence number within the PDU set (PSN).

6. The apparatus of claim 1, wherein the one or more processors are further configured to cause the apparatus to:
receive, from the network node, at least one additional packet of the first PDU set, the at least one additional packet indicating an updated PDU set size associated with the second PDU set; and
transmit, to the network node, an indication of an updated PDU set size associated with the second PDU set.

7. The apparatus of claim 6, wherein the one or more processors, to cause the apparatus to transmit the indication of the updated PDU set size, are configured to cause the apparatus to transmit a UE assistance information (UAI) radio resource control (RRC) message comprising the indication of the updated PDU set size.

8. The apparatus of claim 1, wherein the at least one packet of the first PDU set comprises at least one of a real-time transport protocol (RTP) packet or a secure RTP (SRTP) packet.

9. The apparatus of claim 8, wherein the at least one RTP packet comprises at least one of an encrypted RTP header extension element that includes the portion of the PDU set information or an encrypted RTP payload that includes the portion of the PDU set information.

10. The apparatus of claim 8, wherein the at least one packet of the first PDU set comprises an encrypted portion that includes at least a portion of the PDU set information.

11. A method of wireless communication performed by a user equipment (UE), comprising:
receiving, from a network node during a first time period, at least one packet of a first protocol data unit (PDU) set, the at least one packet of the first PDU set comprising PDU set information associated with a second PDU set;
transmitting, to the network node, a portion of the PDU set information, wherein the portion of the PDU set information comprises a PDU set size (PSSize) associated with the second PDU set; and
receiving, in association with the portion of the PDU set information and during a second time period that occurs subsequent to the first time period, at least one packet of the second PDU set.

12. The method of claim 11, wherein the at least one packet of the first PDU set comprises an encrypted portion that includes the portion of the PDU set information.

13. The method of claim 12, wherein the PDU set information indicates the PDU set size (PSSize) associated with the second PDU set and one or more of:
a PDU set sequence number (PSSN) associated with the second PDU set,
a PDU set importance (PSI) associated with the second PDU set,
an end of a data burst (EDB) associated with the second PDU set, or
a PDU sequence number within the PDU set (PSN).

14. The method of claim 13, further comprising:
receiving, from the network node, at least one additional packet of the first PDU set, the at least one additional packet indicating an updated PDU set size associated with the second PDU set; and
transmitting, to the network node, an indication of an updated PDU set size associated with the second PDU set.

15. The method of claim 14, wherein transmitting the indication of the updated PDU set size further comprises:
transmitting a UE assistance information (UAI) radio resource control (RRC) message comprising the indication of the updated PDU set size.

16. The method of claim 12, wherein the at least one packet of the first PDU set comprises at least one of a real-time transport protocol (RTP) packet or a secure RTP (SRTP) packet.

17. The method of claim 16, wherein the at least one RTP packet comprises at least one of an encrypted RTP header extension element that includes the portion of the PDU set information or an encrypted RTP payload that includes the portion of the PDU set information.

18. The method of claim 11, wherein the at least one packet of the first PDU set indicates an identifier associated with the second PDU set.

19. The method of claim 18, wherein the identifier comprises a PDU set sequence number (PSSN).

20. A non-transitory computer-readable medium storing a set of instructions for wireless communication, the set of instructions comprising:
    one or more instructions that, when executed by one or more processors of a user equipment (UE), cause the UE to:
        receive, from a network node during a first time period, at least one packet of a first protocol data unit (PDU) set, the at least one packet of the first PDU set comprising PDU set information associated with a second PDU set;
        transmit, to the network node, a portion of the PDU set information, wherein the portion of the PDU set information comprises a PDU set size (PSSize) associated with the second PDU set; and
        receive, in association with the portion of the PDU set information and during a second time period that occurs subsequent to the first time period, at least one packet of the second PDU set.

21. The non-transitory computer-readable medium of claim 20, wherein the at least one packet of the first PDU set comprises an encrypted portion that includes at least a portion of the PDU set information.

22. The non-transitory computer-readable medium of claim 20, wherein the at least one packet of the first PDU set indicates an identifier associated with the second PDU set.

23. The non-transitory computer-readable medium of claim 22, wherein the identifier comprises a PDU set sequence number (PSSN).

24. The non-transitory computer-readable medium of claim 20, wherein the PDU set information indicates the PDU set size (PSSize) associated with the second PDU set and one or more of:
    a PDU set sequence number (PSSN) associated with the second PDU set,
    a PDU set importance (PSI) associated with the second PDU set,
    an end of a data burst (EDB) associated with the second PDU set, or
    a PDU sequence number within the PDU set (PSN).

25. The non-transitory computer-readable medium of claim 20, wherein the one or more instructions are further executable to cause the UE to:
    receive, from the network node, at least one additional packet of the first PDU set, the at least one additional packet indicating an updated PDU set size associated with the second PDU set; and
    transmit, to the network node, an indication of an updated PDU set size associated with the second PDU set.

26. The non-transitory computer-readable medium of claim 25, wherein the one or more processors, to cause the UE to transmit the indication, further cause the UE to:
    transmit a UE assistance information (UAI) radio resource control (RRC) message comprising the indication of the updated PDU set size.

27. The non-transitory computer-readable medium of claim 20, wherein the at least one packet of the first PDU set comprises at least one of a real-time transport protocol (RTP) packet or a secure RTP (SRTP) packet.

28. The non-transitory computer-readable medium of claim 27, wherein the at least one RTP packet comprises at least one of an encrypted RTP header extension element that includes at least a portion of the PDU set information or an encrypted RTP payload that includes at least a portion of the PDU set information.

29. The non-transitory computer-readable medium of claim 28, wherein the at least one packet of the first PDU set comprises an encrypted portion that includes at least a portion of the PDU set information.

* * * * *